United States Patent
Besong et al.

(10) Patent No.: US 12,018,213 B2
(45) Date of Patent: Jun. 25, 2024

(54) REACTOR FEED SYSTEMS

(71) Applicant: Recycling Technologies Ltd, Swindon (GB)

(72) Inventors: Marvine Besong, Swindon (GB); Colin Kedge, Compton (GB)

(73) Assignee: Recycling Technologies Ltd, Swindon (GB)

( * ) Notice: Subject to any disclaimer, the term of this patent is extended or adjusted under 35 U.S.C. 154(b) by 52 days.

(21) Appl. No.: 17/773,796

(22) PCT Filed: Nov. 3, 2020

(86) PCT No.: PCT/GB2020/052783
§ 371 (c)(1),
(2) Date: May 2, 2022

(87) PCT Pub. No.: WO2021/089995
PCT Pub. Date: May 14, 2021

(65) Prior Publication Data
US 2022/0363994 A1    Nov. 17, 2022

(30) Foreign Application Priority Data
Nov. 4, 2019 (GB) ..................... 1915998

(51) Int. Cl.
*C10B 53/07* (2006.01)
*B01J 4/00* (2006.01)
(Continued)

(52) U.S. Cl.
CPC ............... *C10B 7/10* (2013.01); *B01J 4/007* (2013.01); *B01J 4/008* (2013.01); *B01J 6/008* (2013.01);
(Continued)

(58) Field of Classification Search
CPC .......... B65G 33/22; B65G 33/24; B01J 4/007
See application file for complete search history.

(56) References Cited

U.S. PATENT DOCUMENTS 4,216,062 A * 8/1980 Kelly ................ C10B 25/06
202/269
4,225,392 A * 9/1980 Taylor ................ C10B 1/04
48/85

(Continued)

FOREIGN PATENT DOCUMENTS

CN    101387406 A    3/2009
CN    203797686 U * 8/2014
(Continued)

OTHER PUBLICATIONS

Espacenet translation of CN 105059847 B.*
(Continued)

*Primary Examiner* — Jonathan Luke Pilcher
(74) *Attorney, Agent, or Firm* — Spencer Fane, LLP

(57) ABSTRACT

A feed system for a reactor, a reactor assembly comprising such a feed system, and a method of supplying a feed material to a reactor with a feed system are provided. The reactor may be a pyrolysis reactor, such as a fluidised bed pyrolysis reactor. A method of pyrolysing a feed material is also provided. The feed system may comprise a feed conduit extending from an inlet to an outlet, and may have a first section including the inlet and a second section including the outlet. The first section may accommodate an auger. The second section may comprise at least one plug forming zone in which feed material is compressed into a substantially gas-tight plug during operation. There may be a temperature regulator for controlling the temperature in the second section. The temperature regulator may comprise a cooling jacket.

34 Claims, 14 Drawing Sheets

(51) Int. Cl.
*B01J 6/00* (2006.01)
*B65G 33/22* (2006.01)
*B65G 33/24* (2006.01)
*C10B 3/02* (2006.01)
*C10B 7/10* (2006.01)
*C10B 49/22* (2006.01)
*C10G 1/10* (2006.01)
*F23G 5/30* (2006.01)

(52) U.S. Cl.
CPC .............. *B65G 33/22* (2013.01); *B65G 33/24* (2013.01); *C10B 3/02* (2013.01); *C10B 49/22* (2013.01); *C10B 53/07* (2013.01); *C10G 1/10* (2013.01); *F23G 5/30* (2013.01); *B01J 2204/002* (2013.01); *B01J 2204/007* (2013.01); *C10G 2300/1003* (2013.01); *F23G 2201/00* (2013.01); *F23G 2205/121* (2013.01); *F23G 2207/20* (2013.01); *F23G 2209/28* (2013.01)

(56) References Cited

U.S. PATENT DOCUMENTS

| | | | | |
|---|---|---|---|---|
| 4,235,676 | A * | 11/1980 | Chambers | C10B 53/00 48/209 |
| 5,996,770 | A | 12/1999 | Kjellqvist | |
| 7,976,259 | B2 * | 7/2011 | Craig | C10L 5/44 414/218 |
| 8,454,801 | B2 * | 6/2013 | Kawami | C10B 53/02 202/113 |
| 2001/0030107 | A1 * | 10/2001 | Simpson | B65G 33/22 198/670 |
| 2006/0000701 | A1 | 1/2006 | Smith | |
| 2010/0133086 | A1 * | 6/2010 | Kawami | C10L 5/44 202/96 |
| 2011/0271649 | A1 | 11/2011 | Tetzlaff | |
| 2014/0037509 | A1 | 2/2014 | Jiang | |
| 2018/0056262 | A1 * | 3/2018 | Miller | C10K 1/16 |

FOREIGN PATENT DOCUMENTS

| | | | | |
|---|---|---|---|---|
| CN | 105059847 | A | 11/2015 | |
| CN | 105059847 | B * | 4/2018 | B65G 33/26 |
| EP | 0953525 | A2 * | 11/1999 | |
| EP | 1288278 | A1 | 5/2003 | |
| GB | 710999 | A | 6/1954 | |
| WO | 2014/128430 | A1 | 8/2014 | |
| WO | 2018/000050 | A1 | 1/2018 | |

OTHER PUBLICATIONS

Espacenet translation of CN 203797686 U.*
Espacenet translation of EP 0953525.*
Written Opinion and International Search Report received in Application Serial No. PCT/GB2020/052783 dated Mar. 25, 2021, 14 pgs.
Sinn H et al., Processing of Plastic Waste and Scrap Tires into Chemical Raw Materials, Especially by Pyrolosis, Angewandte Chemie Int. Ed., 15-11, 660-772, 1976, 13 pgs.
Straw Gasification for Co-combustion in large CHP-Plants, May 31, 2001, 79 pgs.
Search Report received in Application No. GB1915998.7 dated May 4, 2020, 1 pg.
Communication pursuant to Article 94(3) EPC or European Application No. 20801397.9, dated Nov. 27, 2023, European Patent Office.

* cited by examiner

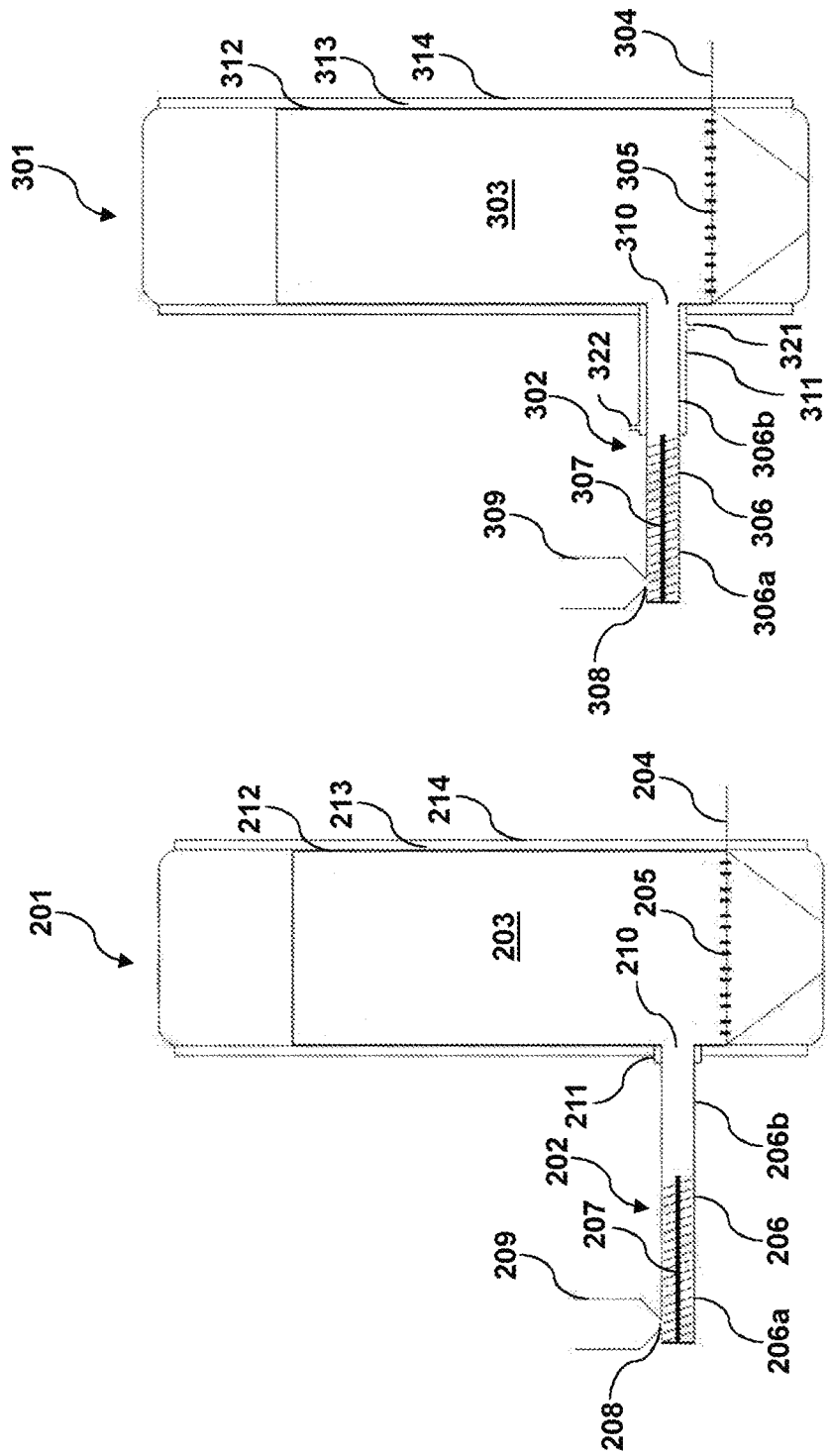

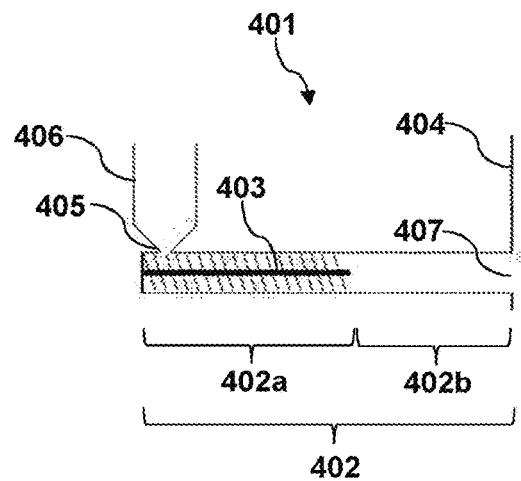 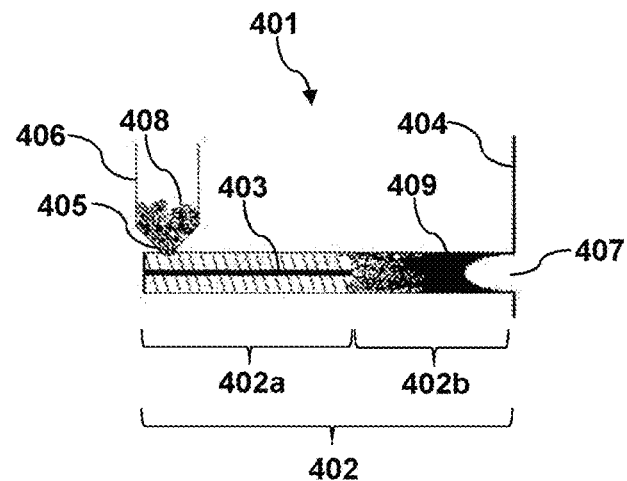
Fig. 4a    Fig. 4b
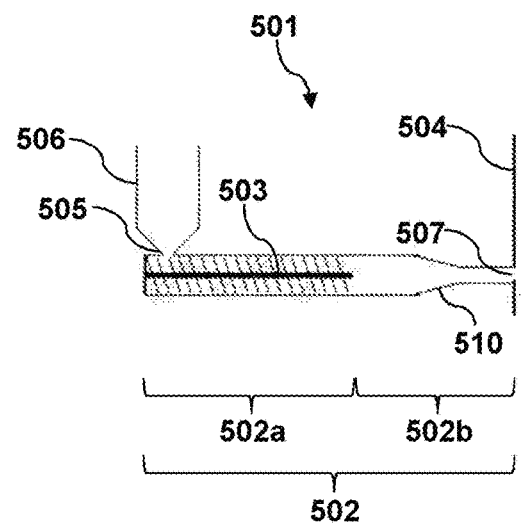 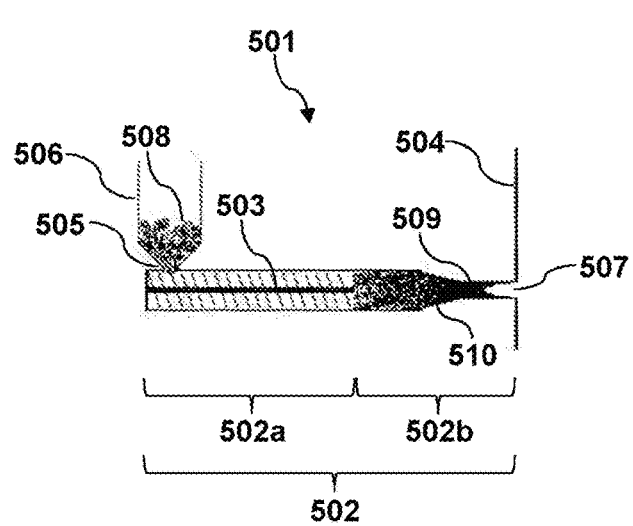
Fig. 5a    Fig. 5b

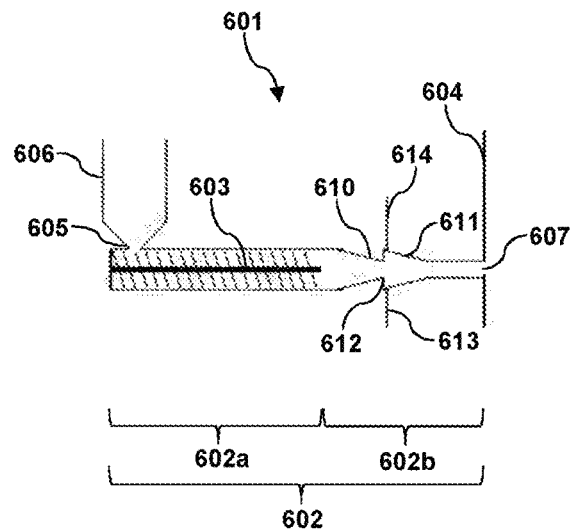 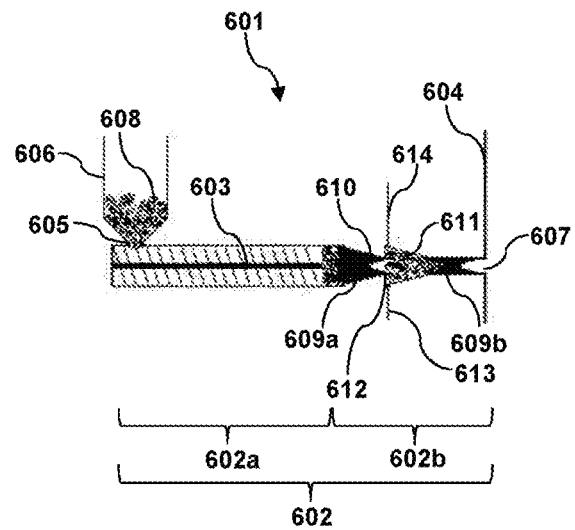
Fig. 6a    Fig. 6b
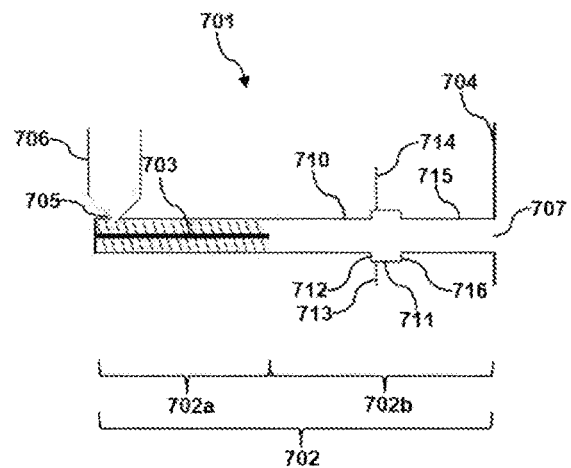 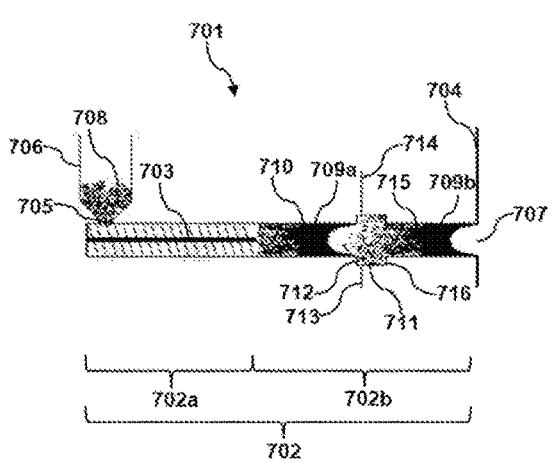
Fig. 7a    Fig. 7b

REACTOR FEED SYSTEMS

FIELD OF THE INVENTION

The present invention concerns a reactor feed system, such as for a reactor comprised in apparatus suitable for subjecting a solid carbonaceous material to pyrolysis, for example for recycling carbonaceous waste material by pyrolysis. More particularly, but not exclusively, this invention concerns a feed system, such as a solid carbonaceous material feed system, for a pyrolysis reactor, such as a fluidised bed pyrolysis reactor. The invention also concerns a method of feeding solid carbonaceous material to a pyrolysis reactor. Preferably, the solid material is a waste material, such as plastic waste, municipal waste and/or biomass.

BACKGROUND OF THE INVENTION

There is an increasing awareness of the need to find cost-effective, efficient and effective methods of extracting useful products from solid carbonaceous materials, especially waste materials. In recent years, it has become apparent that not only is there a need to reduce pollution (often resulting from ineffective waste collection and processing), but also that waste is a valuable resource. This is particularly true of plastic waste. In many countries, mixed waste material is collected and taken to processing centres or recycling centres. Some categories of waste are separated out and sent to recycling processes, either at the centre or elsewhere. For example, waste glass is commonly recycled. Waste that is not recycled may be sent to landfill or may be burnt, typically to provide either heat or electrical energy. Other waste streams (including for example waste produced by industry and/or agriculture) are in some cases sent directly to landfill or to be burnt without any attempt to recover potentially valuable materials.

Plastic waste makes up a significant proportion of waste materials, especially of mixed waste material. A large quantity of mixed plastic waste is continually passing through recycling centres. While recycling processes exist that are capable of making good use of certain types of plastic, such as polyethylene terephthalate (PET) and high-density polyethylene (HDPE), many plastics and composite materials are often more difficult to recycle and so have traditionally been sent to landfill. In many countries, governments have in recent years imposed limits on the amount of material than can be sent to landfill. However, in many cases, including countries throughout Europe, existing plastic recycling infrastructure does not have the capacity to handle the large volumes of plastic waste collected and separated from other waste in municipal recycling centres. As a result, large amounts of plastic waste are sent overseas for processing, incurring cost for the waste collector and causing the originating country to lose out on a resource that could be better used. Furthermore, the receiving country may not itself have adequate facilities for recycling such waste materials, and so in many cases such waste sent overseas can end up in landfill, or simply dumped in the environment.

Even plastic waste streams traditionally considered to be more uniform, such as plastic waste from industrial processes, are often under-recycled. Such industrial plastic waste streams include, for example, composite materials, poorly recycled plastics such as polystyrenes and polyvinylchlorides, and rubbers (such as used/surplus tyres).

Some solutions have been proposed for waste plastic. For example, plastic waste may be used as a fuel in a power station. However, the cost of electricity generated in such a way may be many times the cost of electricity generated from a conventional fossil fuel, such as natural gas. It may also be difficult to use all the heat produced in such processes and much of it is therefore dissipated in cooling towers. Furthermore, using burning plastic waste takes the material out of the 'circular economy' because it typically prevents any further recycling of the material and may result in significant carbon emissions. The combination of low efficiency, high capital cost and limited 'green' credentials can make such solutions unattractive.

Pyrolysis of mixed plastics has been suggested as a solution. Examples include the use of pyrolysis to create an oil or wax that can be processed to create fuel, lubricants and/or new plastics. A challenge with such processes is that mixed plastics are by their nature highly variable in their composition, which can lead to significant variations in pyrolysis product quality and properties over time. Sorting plastic waste to product a relatively uniform feed is typically prohibitively expensive, and often not possible in the case of many composite materials. PCT Publication No. WO2014/128430A1 (Recycling Technologies) discloses a process and apparatus for the treatment of waste comprising Mixed Plastic Waste. The process comprises feeding the waste to a pyrolysis reactor, and pyrolysing the waste in the pyrolysis reactor to produce a pyrolysis product. The pyrolysis may be carried out in a fluidised-bed pyrolysis reactor. The temperature and residence time of material in the reactor is controlled in dependence on an attribute of the pyrolysis product, such as hydrocarbon chain length. Thus, WO2014/128430A1 allows for the use of a variable Mixed Plastic Waste feed by using feedback control based on the nature of the pyrolysis product. Pyrolysis processes have also been used for other carbonaceous material streams, such as biomass.

Pyrolysis is the thermal decomposition of a material in an inert atmosphere. Pyrolysis of carbonaceous material, for example plastic waste, is typically carried out at an elevated temperature of at least 400° C. in a low-oxygen (e.g. oxygen-free) atmosphere in order to produce lower carbon materials, such as $C_5$-$C_{100}$ hydrocarbons. If significant quantities of oxygen are admitted into the reactor, the carbonaceous material will burn, ultimately generating undesirable oxides such as carbon dioxide, and water. It will be appreciated that it is important to avoid ingress of air (and thus oxygen) into the pyrolysis reactor. One approach is to use a batch reactor system, wherein a reactor is charged with feed material, purged of oxygen, the feed material subjected to pyrolysis, and then the pyrolysis product withdrawn from the reactor. Batch processes are typically expensive to operate, not only because the charging and withdrawing steps are time consuming and complex, but also because subjecting the reactor to alternating heating and cooling steps is wasteful of energy. In continuous pyrolysis processes, it is usually necessary for the pyrolysis apparatus to include some form of air-lock loading system for transferring material from a storage hopper into the pyrolysis reactor. One approach is to use a sequence of rams that progressively move material from one piston housing to another, expelling air at each step. While such mechanisms (also known as breach-load feeders) are effective, the multiple moving parts can make then expensive to manufacture and maintain. In the case of systems for processing plastic material, another approach is to melt the plastic feed material and supply it into the pyrolysis reactor as a liquid.

PCT Publication No. WO 2018/000050 A1 discloses a plastic waste pyrolysis apparatus comprising a heated screw extruder which generates molten mixed plastic waste that flows into the top of the pyrolysis reactor. Such a system has a number of drawbacks, including: (i) energy is required to heat the extruder; (ii) variability in the composition of the plastic feed can make it difficult/impossible to properly melt the feed; (iii) the molten plastic may give off vapours damaging to people's health and/or posing a fire risk; and (iv) shut-down of the system is complicated by the need to avoid plastic solidifying in or downstream of the extruder. A plastic waste pyrolysis process is also disclosed in Sinn H et al.: "PROCESSING OF PLASTIC WASTE AND SCRAP TIRES INTO CHEMICAL RAW MATERIALS, ESPECIALY BY PYROLYSIS", ANGEWANDTE CHEMIE INTERNATIONAL EDITION, WILEY-VCH VERLAG GMBH, vol. 15, no. 11, 1 January 1976 (1976-01-01), pages 660-672, XP001048759, ISSN: 1433-7851. A plug-forming biomass screw feeder is disclosed in the report titled "Straw gasification for co-combustion in large CHP plants" published by Foster Wheeler Energia Oy and Energi E2 A/S on 31 May 2001 (downloaded from http://www.ieatask33.org/content/publications/Publications CHP). The system is complex, with many moving parts including a plug chopper and fire valve downstream of the compression screw feeder. U.S. Pat. No. 5,996,770 discloses a woodchip plug screw feeder for use in pulp processing.

A particularly effective type of pyrolysis reactor for carbonaceous materials is the fluidised bed reactor. In a fluidised bed reactor, a solid particulate substance is agitated with a pressurised fluid, suspending the particles and causing the particulate material to behave as a fluid. The feed material (e.g. a carbonaceous solid, such as plastic waste) is introduced into the fluidised bed reactor, with the feed material becoming entrained in the fluidised particulate material. In a dual bed system, the particulate material circulates between two beds, e.g. including a first bed contained in a combustor vessel where the particulate material is heated, and a second bed in a pyrolysis vessel where the particulate material transfers heat to the entrained feed material. In some systems, one or more products from the pyrolysis reactor (e.g. char and/or light hydrocarbon gas) is burned in the combustor vessel to heat the particulate material.

A consideration in fluidised bed pyrolysis reactor design is where in the reactor to introduce the feed material. One option is to introduce the feed material into the reactor in the freeboard zone above the fluidised bed. Another option is to introduce the feed material directly into the fluidised bed. It will be appreciated that there is often a significant temperature differential between the inside of the pyrolysis reactor and the outside of the reactor. Thus, when feeding material into the reactor, it may be that the material at the reactor end of the feed system, and the end of the feed system itself, is exposed to a significantly higher temperature than the material at the other end of the feed system. Typically, the temperature above the fluidised bed is lower than the temperature in the bed, and so it can be more straightforward to introduce plastic material above the bed. On the other hand, introducing feed material directly into the bed can facilitate faster and more even mixing of the plastic material into the bed. A further challenge in providing an effective waste material recycling process is in logistics. Often, feedstocks are relatively low-value, and typically quite low density. Furthermore, even after processing, waste streams are typically contaminated by significant amounts of debris and water. Some approaches to waste material recycling have focused on the design of large-scale equipment capable of processing tens, or hundreds, of thousands of tonnes of mixed waste per year. Such centralised facilities often require many hundreds of heavy goods vehicle movements per year, and necessarily cover a very large catchment area (thus requiring the transport of low value waste material over large distances). It will be appreciated that a challenge in providing effective processes for recycling waste material is the need to provide equipment that can be cost-effectively manufactured, operated and maintained on an appropriate scale. A particular challenge is how to mass-produce medium-scale equipment capable of handling 5,000-50,000 tonnes of waste material, such as plastic waste, per year.

There remains a need for an improved pyrolysis reactor feed system, such as a feed system capable of supplying carbonaceous waste, for example plastic waste, into a fluidised bed reactor, a feed system able to avoid gas transfer between the inside and the outside of the reactor, and a feed system that can be manufactured and maintained in a cost-effective manner. There also remains a need to provide cost-effective, medium scale waste recycling apparatus.

The present invention seeks to mitigate the above-mentioned problems. Alternatively or additionally, the present invention seeks to provide an improved process and apparatus for feeding material to a pyrolysis reactor, such as a reactor employed in the treatment of carbonaceous waste, for example mixed plastic waste.

SUMMARY OF THE INVENTION

The present invention provides, according to a first aspect, a feed system for a pyrolysis reactor, wherein the feed system comprises a feed conduit having an inlet for receiving a feed material, and an outlet for discharging said feed material into the reactor, the feed conduit having a first section comprising the inlet and a second section comprising the outlet, the first section accommodating an auger, and the second section comprising at least one plug forming zone. The auger is configured to convey the feed material from the inlet towards the outlet and to discharge the feed material into the second section. When the feed system is in use, feed material discharged by the auger into the second section accumulates into a plug of feed material in the plug forming zone. The plug of feed material provides a gas barrier in the second section of the feed conduit. Preferably, the plug forming zone is sized and configured to promote said accumulation of the feed material. For example, the at least one plug forming zone may have a length:diameter ratio effective to cause build-up of feed material into a plug as the feed material is urged through the zone. It will be appreciated that numerous different feed conduit geometries may be employed in the second section to effect a plug forming zone. The gas barrier inhibits or prevents gas flow along the conduit between the inlet and the outlet. Preferably, the second section defines an internal void extending from the auger to the outlet, for example wherein at least part of the void defines the plug forming zone. It will be understood that a void is free of any internal device, such as an auger and/or an auger drive shaft. Having the plug forming zone separate to the auger may, for example, allow the plug to form without jamming the auger. Such an arrangement may be particularly advantageous during start-up/shut-down of the system where such a blockage could present a large resistance to initial movement of the auger. Preferably, the feed system is for feeding solid carbonaceous material, such as waste material, into the reactor. The reactor may be a fluidised bed reactor. Preferably, the feed system is configured to dispense feed material from the outlet directly into the pyrolysis reactor. Optionally, the plug forms a gas barrier having a leak rate of gas (e.g. pyrolysis gas, such as pyrolysis gas comprising light hydrocarbon gases, such as light hydrocarbon gas) through the plug of no more than 0.5 l/min, such as 0.1 l/min, for example 0.01 l/min. As used herein, light hydrocarbons are $C_1$-$C_6$ hydrocarbons. Leakage gas through the plug may, for example, be identified by measuring pressure increase upstream of the plug, detecting the presence of light hydrocarbon gases upstream of the plug, and/or detecting a temperature increase upstream of the pug. Any suitable gas, pressure and/or temperature sensor may be used. Non-limiting examples of suitable gas sensors include electrochemical, catalytic bead, photionization, infra-red and semiconductor sensors. Measuring the increase in gas pressure and/or light hydrocarbon concentration upstream of the plug over time may provide an indication of the leak rate through the plug. As used herein, the pyrolysis feed material may be any carbonaceous material. Non-limiting examples of carbonaceous feed materials are waste plastics (including, for example, mixed and segregated plastics and rubbers) and biomass (including waste biomass, by-product biomass and crop biomass). Optionally, the feed material is a waste stream, for example a waste stream selected from mixed plastic waste, segregated plastic waste, scrap tyres, biomass waste and municipal waste (including for example domestic and/or industrial municipal waste). It will be appreciated that any form of biomass material may be used, including for example food waste, forestry products (such as wood-based chippings or pellets), and crops (such as whole crops or crop by-products such as straw). The pyrolysis feed material is a solid at ambient temperature and pressure.

In use, feed material is conveyed through the feed conduit by operation of the auger. For example, it may be that the auger comprises at least one blade arranged in a helix and configured to urge feed material through the feed conduit as the auger rotates, preferably wherein the auger rotates about an axis parallel to the longitudinal axis of the feed conduit. As the auger is operated, feed material so conveyed exits the auger into the second section of the feed conduit, and thus into the plug forming zone. In use, said feed material accumulates in the plug forming zone of the second section, and is urged through the second section towards the outlet as more material is conveyed into the second section by the auger. As it is urged through the plug forming zone, the feed material compresses into a plug of feed material that forms a seal in the second section of the feed conduit. For example, friction between feed material and the internal surfaces of the conduit in the plug forming zone slows the feed material, resulting in accumulation and compression as further material is conveyed into the second section by the auger. The plug of feed material forms inhibits or prevents flow of gas through the feed conduit, including for example flow of air into the pyrolysis reactor and/or flow of pyrolysis gas from the pyrolysis reactor.

The first section may include a first end of the conduit, and/or the second section may include a second end of the conduit. Optionally, the inlet is at the first end, and/or the outlet is at the second end. Optionally, the second end is configured for attachment to an opening in a wall of the pyrolysis reactor. Preferably, the outlet of the feed conduit is configured to provide a permanently open connection to the reactor. For example, when the feed system is connected to the pyrolysis reactor, the second section of the feed conduit is open to the reactor. It will be understood that the second section of the conduit is open to the reactor when there is no material handling device (such as an additional auger and/or a valve arrangement) disposed between the second section of the conduit and the reactor. Preferably, the feed system is configured so that the plug(s) of feed material forms the only gas barrier(s) between the outlet (and optionally the reactor when the feed system is connected to the reactor) and the first section of the feed conduit when the feed system is in use.

Preferably, the feed system comprises a temperature regulator for controlling the temperature of at least a portion of the second section of the feed conduit, for example including the second end of the feed conduit, such as all of the second section. Optionally, the temperature regulator provides temperature control for the second section and at least part of the first section. Optionally, the temperature regulator is operable to cool the plug forming zone of the second section, and/or a portion of the second section downstream of the plug forming zone. Optionally, the temperature regulator is a heating and/or cooling jacket, for example a heating and/or cooling jacket that at least partially surrounds said portion of the feed conduit. The temperature regulator may allow conduction of heat by the feed conduit itself and by feed material inside the feed conduit to be controlled and/or avoided, and/or may allow heat generated by friction between feed material and the feed conduit to be dissipated. Optionally, the heating and/or cooling jacket is configured to utilise a heating and/or cooling fluid, such as water or oil, preferably oil. Preferably, the heating and/or cooling jacket extends along the second section from a position at or proximate the outlet of the feed conduit to a position intermediate the outlet and the inlet of the feed conduit, for example to a position along the second section or a position along the first section. Optionally, the jacket is configured so that when the feed system is connected to a pyrolysis vessel provided with an outer insulation layer and an inner wall, the jacket protrudes beyond an outer surface of the insulation layer towards the inner wall of the reactor. It may be that when the jacket protrudes through at least part of the insulation layer, the jacket provides particularly effective temperature control of the feed conduit. Preferably the jacket comprises a fluid inlet and a fluid outlet. Optionally, the cooling fluid jacket has a proximal end and a distal end, wherein the proximal end is located closer to, for example at, the second end of the feed conduit. Optionally, the fluid inlet is provided at or towards the proximal end, and the fluid outlet is provided at or towards the distal end. Providing the fluid inlet at or towards the proximal end may provide the highest cooling capacity at the highest temperature end of the feed conduit.

Optionally, the temperature regulator is a heating and cooling temperature regulator, for example being configured to operate in (i) a first cooling mode in which the temperature regulator acts to cool the feed conduit, and (ii) a second heating mode in which the temperature regulator acts to heat the feed conduit. Additionally or alternatively, the temperature regulator may be a controllable temperature regulator (such as a variable flow fluid cooling jacket), for example being operable in (i) a first high capacity cooling mode, and (ii) in a low capacity cooling mode, wherein the cooling capacity of the temperature regulator is greater in the high capacity mode than it is in the low capacity mode. For example, it may be that supply of fluid to the jacket is reduced or stopped when operating the cooling jacket in the low capacity mode. It may be that during start-up/shut-down of the process, or in the event of a blockage in the feed conduit, the temperature regulator is operable to alter the temperature of the feed conduit and the feed material within it, and/or to allow the temperature of the feed conduit and the feed material within it to alter. Such a temperature regulator may be particularly useful when the feed material comprises a material having a melting point below the operating temperature of the pyrolysis reactor, for example plastic waste.

Additionally or alternatively, the feed conduit optionally comprises (e.g. at its second end) an insulating connector for joining the feed system to the pyrolysis reactor. Optionally, the insulating connector is in the form of a gasket or collar. Optionally, the insulating connector comprises (or consists essentially of) a ceramic material. For example, it may be that the outlet of the feed conduit is defined by such an insulating connector. Providing an insulating connector as the join between the pyrolysis reactor and the feed conduit may help prevent conduction of heat by the feed conduit.

Optionally, the feed conduit is a linear feed conduit, for example defining a straight internal bore leading from the first end to the second end. Additionally or alternatively, it may be that the second section defines an elongate void having a longitudinal axis, optionally wherein the longitudinal axis of the void is parallel to and continuous with the longitudinal axis of the auger. For example, the void and the auger may share a common longitudinal axis. When the auger and the void are so aligned, the feed conduit may provide a convenient and relatively low resistance pathway for the feed material. Optionally, the inlet of the feed conduit is provided in a side-wall of the conduit, for example in the top of the conduit side-wall (such as at a position vertically above the auger when the feed conduit is in use). For example, it may be that the inlet is arranged so that feed material passing through the inlet enters the conduit in a direction that is not parallel (e.g. that is substantially perpendicular) to the longitudinal axis of the feed conduit. Such an arrangement may allow feed material to be conveniently taken up by the auger, and/or allow feed material to fall into the feed conduit under gravity. Optionally, the outlet of the feed conduit forms an end of the conduit (e.g. the conduit is open-ended at the second end). For example, the outlet may be arranged so that feed material exits the conduit in a direction substantially parallel to the longitudinal axis of the feed conduit, which may provide a low resistance route for the plug of compacted feed material to exit the conduit and enter the reactor. It will be understood that angles are substantially the same when they differ by no more than 5°, such as no more than 3°, for example no more than 1°.

Optionally, the feed conduit has an average internal diameter between the inlet and the outlet of from 80 mm to 500 mm, such as from 100 mm to 400 mm, for example 120 mm to 220 mm. Optionally, the feed conduit has a minimum internal diameter between the inlet and the outlet of at least 50 mm, such as at least 80 mm, for example at least 100 mm. Optionally, the feed conduit has a maximum internal diameter between the inlet and the outlet of no more than 600 mm, such as no more than 500 mm, optionally no more than 400 mm, for example no more than 220 mm. Optionally, the internal diameter of the first section is substantially the same as the internal diameter of the second section. Optionally, the internal diameter of the first section is substantially constant along its length, for example the constant internal diameter being 100 mm to 400 mm, such as 150 mm to 250 mm. Optionally, the internal diameter of the first section is substantially the same as the internal diameter of the second section where the second section adjoins the first section. Optionally, the feed conduit has an average internal cross-sectional area between the inlet and the outlet of from 5000 to $8 \times 10^5$ mm$^2$, such as from 30000 to $5 \times 10^5$ mm$^2$, for example 45000 to $1.5 \times 10^5$ mm$^2$. It will be understood that internal cross-sectional area is measured across the width and height of the feed conduit. In other words, measured in a y-z plane, where the longitudinal axis of the feed conduit lies along an x axis, wherein x, y and z axis are perpendicular to each other. Optionally, the feed conduit has a minimum internal cross-sectional area between the inlet and the outlet of at least 7800 mm$^2$, such as at least 20000 mm$^2$, for example at least 30000 mm$^2$. Optionally, the feed conduit has a maximum internal cross-sectional area between the inlet and the outlet of no more than $11 \times 10^5$ mm$^2$, such as no more than $8 \times 10^5$ mm$^2$, optionally no more than $5 \times 10^5$ mm$^2$, for example no more than $1.5 \times 10^5$ mm$^2$. Optionally, the internal cross-sectional area of the first section is substantially the same as the internal cross-sectional area of the second section. Optionally, the internal cross-sectional area of the first section is substantially constant along its length, for example the constant internal cross-sectional area being 30000 to $5 \times 10^5$ mm$^2$, such as from 70000 to $2 \times 10^5$ mm$^2$. Optionally, the internal cross-sectional area of the first section is substantially the same as the internal cross-sectional area of the second section where the second section adjoins the first section. Optionally, the first section has a length to internal diameter ratio of from 4:1 to 20:1, such as from 5:1 to 15:1, for example from 8:1 to 12:1. Optionally, the first section has a length of from 0.3 m to 2.5 m, such as from 0.5 to 2.0 m, for example from 1.0 m to 1.5 m. Optionally, the second section has a length to average internal diameter ratio of from 4:1 to 20:1, such as from 5:1 to 15:1, for example from 8:1 to 12:1. Optionally, the second section has a length of from 0.2 m to 2 m, such as from 0.3 m to 1.5 m, for example from 0.5 m to 1 m. The geometry of the second section affects plug formation. At very low length to diameter ratios, the second section may not be long enough for an adequate plug of material to form as the material is urged through the second section. However, at very high length to diameter ratios, the second section may be so long that the plug becomes overly compacted and the force required to urge feed material through the second section becomes excessively high. It will be understood that dimensions are substantially the same when the differ by no more than 10% of the largest dimension, such as no more than 5%, for example no more than 2%.

As used herein, the terms 'downstream' and 'upstream' are relative to the overall flow direction of feed material through the feed conduit (and any of its parts). Thus, the feed inlet is upstream of the feed outlet.

Optionally, the internal diameter of the second section is substantially constant along at least 90% of its length, such as along its entire length. Alternatively, the internal diameter of the second section varies along its length. Variations in the internal diameter affect flow resistance, with reduced diameter portions increasing flow resistance experienced by feed material as it passes through the second section, and increased diameter portions reducing flow resistance. Increasing flow resistance may promote effective plug formation, but may also cause blockage if the resistance is too high. Decreasing flow resistance may promote dispersal of feed material downstream of the plug, but may also prevent plug formation if there is an insufficient portion with a higher flow resistance. Additionally or alternatively, the internal cross-sectional area of the second section is substantially constant along at least 90% of its length, such as along its entire length. Optionally, the internal cross-sectional area of the second section varies along its length. It will be appreciated that variations in internal cross-sectional area affect flow resistance in a similar manner to variations in internal diameter. Optionally, the second section has an average internal diameter of from 80 mm to 500 mm, such as from 100 mm to 400 mm, for example 120 mm to 250 mm. Optionally, the second section has a minimum internal diameter of at least 50 mm, such as at least 80 mm, for example at least 100 mm. Optionally, the second section has a maximum internal diameter of no more than 600 mm, such as no more than 500 mm, optionally no more than 400 mm, for example no more than 250 mm. Optionally, the second section has a maximum internal diameter 2ID1 at a first position, and a minimum internal diameter 2ID2 at a second position, 2ID1 being different to 2ID2. Optionally, the second position is in the plug forming zone. Optionally, the ratio of 2ID1: 2ID2 is from 50:49 to 5:2, for example 25:24 to 2:1, such as 10:9 to 3:2. Optionally, the second position is downstream of the first position. Optionally, the second section has an average internal cross-sectional area of from 5000 to $8\times10^5$ mm$^2$, such as from 30000 to $5\times10^5$ mm$^2$, for example 45000 to $2\times10^5$ mm$^2$. Optionally, the second section has a minimum internal cross-sectional area of at least 7800 mm$^2$, such as at least 20000 mm$^2$, for example at least 30000 mm$^2$. Optionally, the second section has a maximum internal cross-sectional area of no more than $11\times10^5$ mm$^2$, such as no more than $8\times10^5$ mm$^2$, optionally no more than $5\times10^5$ mm$^2$, for example no more than $1.5\times10^5$ mm$^2$. Optionally, the second section has a maximum internal cross-sectional area 2CS1 at a first position, and a minimum internal cross-sectional area 2CS2 at a second position, 2CS1 being different to 2CS2. Optionally, the second position is in the plug forming zone. Optionally, the ratio of 2CS1: 2CS2 is from 50:49 to 5:2, for example 25:24 to 2:1, such as 10:9 to 3:2. Optionally, the second position is downstream of the first position.

Optionally, the second section comprises at least one contracting portion, such as a tapered contracting portion and/or a stepped contracting portion, in the at least one plug forming zone. It will be appreciated that 'contracting' is relative to the flow direction of feed material through the conduit when the feed system is in use, thereby providing a larger internal diameter at the upstream end of the contracting portion than at the downstream end. A contracting portion may assist in the formation of a plug of feed material and/or help control where the plug forms. Optionally, the at least one tapered portion has an average taper angle of 1° to 30°, such as 3° to 20°, for example 5° to 10°, along the length of the tapered portion. As used herein, the taper angle is the inclusive taper angle. It will be understood that an inclusive angle is the sum of the angles of the opposing sides of the tapered section. It will be appreciated that the average taper angle is relative to the longitudinal axis of the second section. Optionally, the at least one tapered portion has a length to maximum diameter ratio of from 1:10 to 10:1, such as 1:5 to 5:1, for example 1:2 to 2:1. Optionally, the at least one tapered portion has a length of from 50 mm to 500 mm, for example 100 mm to 400 mm, such as 150 mm to 350 mm. It will be appreciated that the length of a tapered portion is measured along its longitudinal axis (usually also the longitudinal axis of the second section). It will be appreciated that a stepped portion is a portion where the internal diameter changes abruptly, such as having a taper angle of 45° to 90°, such as 60° to 90°, for example 80° to 90°. Optionally, the second section comprises at least one expanding portion, such as an expanding stepped portion and/or an expanding tapered portion. It will be appreciated that 'expanding' is relative to the flow direction of feed material through the conduit when the feed system is in use, thereby providing a larger internal diameter at the upstream end of the expanding portion than at the downstream end. Optionally, the second section comprises at least one constant diameter portion. It will be appreciated that 'constant diameter' means constant diameter relative to the flow direction of feed material through the conduit when the feed system is in use, thereby providing the same internal diameter at the upstream end of the constant diameter portion as at the downstream end. Optionally, the at least one constant diameter portion has a length to diameter ratio of from 0.5:1 to 10:1, such as 1:1 to 5:1, for example 2:1 to 4:1. Optionally, the at least one constant diameter portion has a length of from 20 mm to 1000 mm, for example 100 mm to 600 mm, such as 200 mm to 400 mm. Optionally, the second section comprises at least one contracting tapered portion and at least one expanding stepped portion, and optionally at least one constant diameter portion disposed between the contracting tapered portion and the expanding stepped portion. Optionally, the second section comprises a plurality of tapered portions, such as a plurality of contracting tapered portions. Optionally, each tapered portion is separated from another tapered portion by a constant diameter portion and/or a stepped portion (e.g. an expanding stepped portion). The tapered portions may have the same or different taper angles and/or the same or different lengths. There may be a constant diameter portion adjacent and/or between tapered and/or stepped portions. Optionally, the second section comprises a first contracting tapered portion, a second contracting tapered portion, an expanding stepped portion disposed between the first and second contracting tapered portions, optionally a first constant diameter portion disposed between the first contracting tapered portion and the expanding stepped portion, and optionally a second constant diameter portion disposed between the expanding stepped portion and the second contracting tapered portion. Optionally, the second section comprises a plurality of constant diameter portions, each constant diameter portion being separated from another constant diameter portion by at least one tapered and/or stepped portion, optionally wherein each constant diameter portion has a diameter different to another constant diameter portion. It will be appreciated that each tapered portion may be a tapered portion as defined above, each stepped portion may be a stepped portion as defined above, and each constant diameter portion may be a constant diameter portion as defined above. Optionally, at least one, optionally every, tapering portion has a frusto conical shape. It will be understood that the, or each, constant diameter portion is also a constant internal cross-sectional area portion, meaning constant internal cross-sectional area relative to the flow direction of feed material through the conduit when the feed system is in use, thereby providing the same internal cross-sectional area at the upstream end of the constant internal cross-sectional area portion as at the downstream end.

Optionally, any contracting and/or expanding portion referred to herein may be an adjustable contracting and/or expanding portion. For example, the second section of the conduit may comprise a contracting and/or expanding portion with a mechanically adjustable taper angle. It will be appreciated that an adjustable contracting and/or expanding portion may allow for control of feed material density in the plug forming zone. Additionally or alternatively, the adjustable contracting and/or expanding portion may comprise a feed contacting member, for example movable (i) towards and (ii) away from the longitudinal axis of the feed conduit (e.g. the longitudinal axis of the second section of the feed conduit). Optionally, the feed contacting member is movable along an axis nonparallel with the longitudinal axis of the feed portion. Optionally, said axis is perpendicular to the longitudinal axis of the feed portion. Alternatively, said axis is oblique to the longitudinal axis of the feed portion (e.g. at an angle of from 5° to 85°, such as 25° to 65°, for example 40° to 50° to said longitudinal axis). Having an oblique axis may help reduce wear and tear on the adjustable contracting/expanding portion. Optionally, the feed contacting member is in the form of a piston extendable into the second section of the feed conduit. Optionally, the adjustable contracting and/or expanding portion is an adjustable contracting portion, wherein the feed contacting member is movable between a first, open position and a second, closed position. Optionally, the feed contacting member in the first, open position, provides the adjustable contracting portion with a first internal cross sectional area and/or a first minimum internal diameter, and in the second, closed position, provides the adjustable contracting portion with a second internal cross sectional area and/or a second minimum internal diameter, wherein the second internal cross sectional area is smaller than the first cross-sectional area, and/or the second minimum internal diameter is less than the first minimum internal diameter. Preferably, in the first, open position, the minimum internal cross-sectional area of the adjustable contracting portion is no less than that of the feed conduit immediately upstream of the adjustable contracting portion, and/or the minimum internal diameter of the adjustable contracting portion is no less than that of the feed conduit immediately upstream of the adjustable contracting portion. Preferably, in the second, closed position, the minimum internal cross-sectional area of the adjustable contracting portion is less than that of the feed conduit immediately upstream of the adjustable contracting portion, for example 2% to 50% less, such as 4% to 25% less, for example 5% to 10% less. Additionally or alternatively, the minimum internal diameter of the adjustable contracting portion is less than that of the feed conduit immediately upstream of the adjustable contracting portion, for example 2% to 50% less, such as 4% to 25% less, for example 5% to 10% less. Preferably, the feed contacting member is movable between a plurality of positions intermediate the first, open position and the second, closed position, for example continuously variable between the first, open position and the second, closed position. It will be appreciated that during use, when the feed contacting member is moved into the closed position, the cross-sectional area available for feed material to pass through the feed conduit is reduced. Conversely, when the feed contacting member is moved into the open position, the cross-sectional area available for feed material to pass through is increased. In this way, the adjustable contracting portion may allow for control of compacted feed material density in a plug forming zone of the feed conduit. For example, the adjustable contracting portion may be operated to cause a preliminary compaction of feed material at the upstream end of, or upstream of, a plug-forming zone. Additionally or alternatively, the adjustable contracting portion can be operated to promote formation of a plug of feed material within the adjustable contracting portion. The plug of feed material so formed may, for example, begin to disperse at the downstream end of, or immediately downstream of, the adjustable contracting portion, and feed material may optionally compact to form another plug of feed material further downstream in the plug-forming zone. Additionally or alternatively, a plug of feed material so formed may optionally be continuous with a plug of feed material extending further downstream through the plug-forming zone. Preferably, the adjustable contracting portion is configured so that, in all operating positions (meaning the first, open position, the second, closed position, and any intermediate position), any contraction of the feed conduit is a tapered contraction. For example, when the feed contacting member is in the first, open position, there is no stepped contraction of the feed conduit in the adjustable contracting portion, such as at the downstream end of the adjustable contracting portion. Additionally or alternatively, when the feed contacting member is in the second, closed position, there is no stepped contraction of the feed conduit in the adjustable contracting portion, such as at the upstream end of the adjustable contracting portion. It will be understood that in the open position, if a stepped contraction were present at the downstream end of the adjustable contracting portion, feed material passing through the feed conduit may build up around this stepped contraction, thereby impeding the flow of feed material through the conduit. Similarly, in the closed position, if a stepped contraction were present at the upstream end of the adjustable contracting portion, feed material passing through the feed conduit may build up around this stepped contraction, thereby impeding the flow of feed material through the conduit.

Preferably, when the axis along which the feed contacting member moves is oblique to the longitudinal axis of the feed conduit, the position of the feed contacting member in the closed position is upstream of its position in the open position. In other words, the feed contacting portion is moved against the flow of feed material when moved from the open to the closed position. Such an arrangement may provide better control of the degree of compaction of feed material in the adjustable contracting portion. Optionally, the feed contacting member comprises a feed contacting surface oblique to the longitudinal axis of the feed conduit. Optionally, the feed contacting member comprises a feed contacting surface shaped to cooperate with the internal shape of the feed conduit, preferably to provide a tapered contraction of the feed conduit in all operating positions of the feed contacting member. For example, when the feed conduit is in the form of a tube, the feed contacting surface is preferably shaped to cooperate with the internal shape of the tube. Preferably, the feed conduit is in the form of a tube having a cylindrical bore, and the feed contacting surface has a curved shape that curves around the longitudinal axis of the feed conduit, for example wherein the feed contacting surface forms a section of a notional cone, preferably wherein the notional cone has a longitudinal axis parallel to the longitudinal axis of the feed conduit. Preferably, the longitudinal axis of the notional cone lies along the longitudinal axis of the feed conduit when the feed contacting member is in the second, closed position. Preferably, the notional cone tapers to a point downstream of the adjustable contracting portion.

Optionally, the adjustable contracting portion, if present, is adjustable in response to compaction of feed material in the feed conduit. For example, the adjustable contracting portion may be adjustable to provide substantially constant compaction of feed material. Optionally, the adjustable contracting portion comprises a mechanical actuator configured to move the feed contacting member in response to a control signal, for example a control signal provided by an adjustable contracting portion control system. For example, the mechanical actuator may comprise a drive motor for moving the feed contacting member in response to the control signal. Additionally or alternatively, the mechanical actuator optionally comprises a pneumatic actuator and/or drive system. It will be appreciated that a pneumatic actuator/drive system may provide a particularly efficient and fine-controllable method of moving the feed contacting member. Optionally, said control system is configured to dynamically control movement of the adjustable contracting portion in response to measured operating conditions, such as load on the auger drive system, and/or detected level of pyrolysis gas upstream of the plug forming zone. Additionally or alternatively, the adjustable contracting portion may comprise a resiliently deformable (e.g. compressible) member, such as a spring, configured to maintain a pre-determined compression force on feed material in the feed conduit during operation. It will be understood that the pre-determined compression force may, for example, be adjusted during operation of the feed system in response to said measured operating conditions. It will be understood that such a resiliently deformable member may allow for rapid automatic dynamic adjustment of the contracting portion during operation in a straightforward and convenient manner. Preferably, such a resiliently deformable member is configured to bias the feed contacting member towards the second, closed position. In such a configuration, excessive compaction of feed material may be avoided by the resiliently deformable member allowing movement of the feed contacting member towards the first, open position should the force exerted on the feed contacting member by feed material being urged through the feed conduit by the auger overcome the force exerted by the resiliently deformable member. Similarly, insufficient compaction of feed material may be avoided by the resiliently deformable member urging the feed contacting member to move towards the second, closed position should there be a reduction in the amount of material passing through the conduit. It will be appreciated that such advantages may also be provided by a dynamically controlled mechanical actuator. Preferably, the adjustable contracting portion is configured to provide a variable compressive force. For example, when the adjustable contracting portion may comprise a pre-loading mechanism for varying the compressive force provided by the resiliently deformable member. Optionally, when the resiliently deformable member is a spring, the adjustable contracting portion comprises a variable preloading mechanism for increasing spring compression when the feed contacting member is in the first, open position. For example, the adjustable contraction portion comprises a movable compression plate configured to bear against the spring, such as a compression plate mounted on one or more threaded bars each having a positioning nut for holding the compression plate in position against the spring. Preferably, the compression plate (if present) is moveable along the longitudinal axis of the spring, for example wherein such movement is controlled by moving the positioning nut(s) along the threaded bar(s).

The adjustable contracting portion so described above is an inventive aspect of the invention in its own right, identified below as the fifth aspect of the invention.

When the second section of the feed conduit has a variable internal diameter, the feed system may comprise a temperature regulator configured to control the temperature of a constant diameter portion downstream of a variable diameter portion, and/or the temperature of a variable diameter portion. For example, where the feed system comprises a temperature regulator comprising a fluid jacket (e.g. for cooling and/or heating fluid), the fluid jacket may be disposed around a constant diameter portion and/or a variable diameter portion (e.g. a tapered or stepped portion).

Optionally, the second section comprises at least one fluid inlet and/or at least one fluid outlet separate to the feed inlet and feed outlet. Preferably, the at least one fluid inlet and/or at least one fluid outlet is located upstream of the plug forming zone. Such an inlet/outlet may allow a lubricating fluid to be added to the feed material and/or unwanted fluids (e.g. gases) to be vented from the feed material as the feed material is urged through the second section by operation of the auger. Additionally or alternatively, the feed system comprises a gas sensor in fluid communication with the fluid outlet, the gas sensor being configured to detect gas in the second section, such as hydrocarbon gas. Optionally, the gas sensor is operable to detect pyrolysis gas, and thus to measure the integrity of the plug. Preferably, any gas sensor referred to herein has a lower detection limit for its specified gas of no more than 5 ppm, such as no more than 2 ppm, for example no more than 100 ppb.

Optionally, the second section comprises a first plug forming zone, a second plug forming zone, and a release zone disposed between the first plug forming zone and the second plug forming zone, wherein the release zone is sized and configured such that, when the feed system is in use, disintegration of the plug of feed material formed in the first plug forming zone is promoted as the feed material is urged towards the outlet by operation of the auger (for example by the second section having an diameter in the release zone larger than that in the first plug forming zone). Optionally, the first plug forming zone has a first average diameter, the second plug forming zone has a second average diameter, and the release zone has a third average diameter, the third average diameter being larger than the first average diameter and optionally larger than the second average diameter. Each plug forming section may, independently, be a contracting tapered portion, a constant diameter section, or a contracting stepped portion, or any combination thereof. The release zone may comprise an expanding tapered portion, an expanding stepped portion, or a combination thereof. The release zone may additionally comprise a constant diameter portion or part of a contracting tapered portion. For example, when the second section comprises a first contracting tapered portion, a second contracting tapered portion, an expanding stepped portion disposed between the first and second contracting tapered portions, optionally a first constant diameter portion disposed between the first contracting tapered portion and the expanding stepped portion, and optionally a second constant diameter portion disposed between the expanding stepped portion and the second contracting tapered portion, the first contracting tapered portion and the first constant diameter portion, if present, may form a first plug forming zone, the upstream end of the second contracting tapered portion and/or the second constant diameter portion, if present, may form the release zone, and the second contracting tapered portion (or the downstream end of the second contracting tapered portion) may form the second plug forming zone. The second section may further comprise additional constant diameter portions upstream of the first contracting tapered portion and downstream of the second contracting tapered portions, which may also form part of the first and second plug forming zones, respectively. In use, a plug of feed material formed in the first plug-forming zone may provide a first gas barrier, and a plug of feed material formed in the second plug-forming zone may provide a second gas barrier downstream of the first gas-tight seal and separated from it by the release zone. The release zone is thus separated both from the first section of the feed conduit (and thus from the feed inlet) and from the feed outlet (and thus from the pyrolysis reactor) by the first and second plugs. Multiple plugs may provide a more reliable and resilient barrier to gases exiting or entering the pyrolysis reactor via the feed conduit. Optionally, the second section comprises at least one fluid inlet and/or at least one fluid outlet, for example in the release zone. Said inlet and/or outlet may be in addition to or as an alternative to the fluid inlet/outlet upstream of the first plug forming zone, if present. Optionally, the fluid inlet is used to supply a lubricant fluid into the feed conduit, and/or the fluid outlet is used to provide a controlled vent of pyrolysis gas that has passed through the second plug. It may be that such a fluid outlet and such a fluid inlet are used together to purge the release zone, for example to remove air (more particularly, oxygen) that has passed through the first plug and/or to remove pyrolysis gas that has passed through the second plug. Optionally, the feed system comprises a gas sensor for detecting gas in the release zone, such as a hydrocarbon gas sensor and/or an oxygen sensor. Optionally, the gas sensor is operable to detect pyrolysis gas, and thus to measure the integrity of the second plug. Optionally, the gas sensor is operable to detect oxygen, and thus to measure the integrity of the first plug. Optionally, the feed system comprises a pressure sensor for determining gas pressure in the release zone. An increase of pressure in the release zone may indicate a reduction or loss of integrity of the first plug.

Optionally, the pyrolysis reactor is a fluidised bed reactor, for example a fluidised bed reactor containing a fluidised bed comprising a particulate material. Optionally, during operation of the reactor, the particulate material is fluidised by a flow of a fluid, for example a gas, through the particulate material. For example, it may be that in use, a gas is forced upwards through the particulate material from an array of distributor ports provided below the particulate material. Preferably, the pyrolysis reactor is configured to operate at a temperature of 400° C.-600° C., and optionally at a pressure of 100-500 mbar, such as 150 to 400 mbar.

Optionally, the auger extends along the first section of the feed conduit from the inlet to the end of the first section adjoining the second section. Optionally, the auger comprises a shaft and at least one helicoid flight, the shaft optionally having a diameter SD and the helicoid flight optionally having an outer diameter OD. The difference between the shaft diameter SD and the helicoid flight outer diameter OD is the flight depth FD. Optionally, the feed conduit has an internal diameter ID, for example wherein the first section of the feed conduit has an internal diameter 1ID and the second section of the feed conduit has an internal diameter 2ID.

Optionally, the helicoid flight has a pitch P. Optionally, SD is in the range of from 40 mm to 160 mm, such as from 60 mm to 120 mm, for example 70 mm to 100 mm. Optionally, OD is in the range of from 80 mm to 500 mm, such as from 100 mm to 400 mm, for example 120 mm to 250 mm. Optionally, FD is in the range of from 15 mm to 120 mm, such as from 25 mm to 100 mm, for example from 35 mm to 80 mm. Optionally, ID is 1 to 10 mm greater than OD, such as 2 to 8 mm greater, for example 4 to 6 mm greater. Optionally, the first section has a length of from 0.2 m to 2 m, such as from 0.5 m to 1.75 m, for example from 1 m to 1.5 m. Optionally, P is in the range of from 50 mm to 500 mm, such as 75 mm to 400 mm, for example 100 mm to 200 mm.

Preferably, the auger has a proximal end towards, for example adjacent, the inlet of the feed conduit, and a distal end towards, for example adjacent the second section. Optionally, the helicoid flight has a variable pitch P, for example having a pitch P1 at one end of the auger and a pitch P2 at the other end of the auger. For example, the helicoid flight has a pitch P1 at the proximal end of the auger and a pitch P2 at the distal end of the auger. Preferably, when the auger has a variable pitch, P2 is less than P1. Optionally, the auger has a continuously variable pitch, for example wherein the pitch P continuously decreases from pitch P1 to pitch P2 along the length of the auger. It may be that when P2 is smaller than P1, the push force exerted by the auger on the feed material is higher at the distal end. It will be appreciated that friction between feed material and the inside of the feed conduit often causes the feed material to agglomerate and compact as the material is advanced through the conduit. Thus, it may be desirable to provide a higher push force at the exit of the auger than at the entrance. Furthermore, it may be that having a greater pitch at the entrance of the auger (that is, proximate the inlet) allows the auger to rapidly convey a larger amount of material away from the inlet. Optionally, P1 is in the range of from 150 mm to 250 mm, such as 175 mm to 225 mm, and P2 is in the range of from 50 mm to 150 mm, such as 75 mm to 175 mm.

Optionally, the helicoid flight extends along substantially the whole length of the auger shaft in the first section of the feed conduit, such as along at least 90%, e.g. at least 95%, of the length of the auger in the first section of the feed conduit. It will be appreciated that the shaft may optionally continue through an end wall of the conduit for connection to a drive system, in which case that continuing portion of the shaft is not included when determining the length of the shaft along which the helicoid flight extends. Alternatively, the helicoid flight extends along a first upstream portion of the length of the auger shaft in the first section of the feed conduit, and a second downstream portion of the auger shaft forms a shaft extension. It will be understood that a shaft extension is a portion of auger shaft not provided with a helicoid flight. Optionally, the shaft extension portion of the auger has a length of from 0.1 m to 1.0 m, such as 0.2 m to 0.7 m, for example 0.3 m to 0.5 m. Optionally, when the auger comprises a shaft extension portion, the first upstream portion of the auger shaft has a length of from 0.5 m to 2 m, such as 0.7 m to 1.6 m, for example 0.9 to 1.3 m. Optionally, the auger has a first upstream portion:second downstream portion ratio of from 1:1 to 20:1, such as 1.5:1 to 10:1, for example 2:1 to 5:1.

Optionally, the auger shaft has a substantially constant diameter along its length. Alternatively, the auger shaft optionally has a variable diameter along its length. Optionally, the auger shaft has a first diameter at a first upstream position, and a second diameter at a second downstream position, the first diameter being less than the second diameter. Additionally or alternatively, the shaft diameter increases along the length of the shaft from the upstream end to the downstream end. Optionally, the diameter increases continuously from the upstream end to the downstream end. Alternatively, the shaft has one or more constant diameter sections, optionally wherein the shaft diameter is constant along the length of a first upstream portion and wherein the shaft diameter increases continuously along the length of a second downstream portion. Optionally, the tapered portion of the shaft has a taper angle of 0.5 to 5 degrees, such as 1 to 3 degrees, for example 1 to 2 degrees. Optionally, the maximum shaft diameter is 120 mm, such as 110 mm, for example 1000 mm. Optionally, the minimum shaft diameter is 90 mm, such as 80 mm, for example 70 mm.

Optionally, the first section of the feed conduit defines a proportion of the length of the feed conduit between the inlet and the outlet that is greater than the proportion defined by the second section. For example the length of the feed conduit defined by the first section is approximately the same as the length of the feed conduit defined by the second section. Optionally, the auger extends along the whole of the first section. Optionally the feed conduit is made up of a plurality of segments, such as a plurality of segments arranged end to end. Alternatively, the feed conduit may be formed from a single, unitary component. Optionally, at least one of the first section and the second section of the feed conduit spans one or more segments. Additionally or alternatively, it may be that one segment includes at least a portion of each of the first section and the second section. Optionally, the feed conduit is in the form of a tube, such as a tube having a cylindrical bore. It will be appreciated that the outside of the feed conduit may take any shape.

Preferably, the feed system comprises a valve assembly connected to the inlet of the feed conduit, optionally via a feeder body. The feeder body, if present, provides a gas-tight connection between the valve assembly and the inlet of the feed conduit. The valve assembly is adjustable between a first open configuration and a second closed configuration, wherein the valve assembly is operable to (i) control flow of feed material into the feed conduit, and (ii) control flow of gases into and/or out of the feed conduit. For example, the valve assembly permits admission of feed material into the feed conduit when in the first open configuration, and prevents admission of feed material into the feed conduit when in the second closed configuration. Additionally, the valve assembly may for example permit flow of gases into and/or out of the feed conduit when in the first open configuration, and prevent flow of gases into and/or out of the feed conduit when in the second closed configuration. It will be appreciated that the valve assembly may include any suitable type of valve, for example a slide valve. Optionally, the feed system comprises a sensor system for indirectly or directly detecting presence of pyrolysis gases at a position upstream of the plug-forming zone and downstream of the valve assembly, such as in the feeder body (if present). Optionally, the sensor system includes at least one of (i) a gas sensor, such as a hydrocarbon gas sensor for detecting light hydrocarbon gases, (ii) a temperature sensor, such as a temperature sensor for measuring gas temperature, and (iii) a pressure sensor, such as a pressure sensor for measuring gas pressure. Additionally or alternatively, the sensor system may optionally include an optical sensor, such as an optical sensor for detecting gas vapours. It has been found that passage of gas from the pyrolysis reactor through the plug can lead to increases to any one of (i) concentration of pyrolysis gas (such as light hydrocarbon gases), (ii) temperature, (iii) pressure, and (iv) amount of visible gas vapour, upstream of the plug. Between each loading event (when the valve assembly is opened to admit feed material), such a sensor system allows such increases to be monitored, and thus the integrity of the plug to be determined dynamically. As used herein, terms such as 'dynamic adjustment' mean that a parameter is adjusted at regular intervals during operation of the system in response to changes in system performance. Typically, dynamic adjustment is performed automatically, for example being controlled by computer software executed by a control system. When present, the temperature sensor is preferably positioned to measure temperature close to the upstream end of the plug. For example, the temperature sensor may be located proximate the plug forming zone and/or proximate the downstream end of the auger. It will be understood that the gas sensor and/or the pressure sensor may be conveniently located at any position between the plug and the valve assembly. By way of example, the plug may be considered to provide an adequate gas barrier provided that between loading events: (i) light hydrocarbon gas concentration does not exceed 100 ppm, such as 50 ppm, for example 10 ppm; (ii) gas temperature does not exceed 150° C., such as 100° C., for example 50° C.; or (iii) pressure does not exceed 200 mbarg, such as 150 mbarg, for example 100 mbarg; upstream of the plug. Unless otherwise stated, ppm refers to ppm by volume and ppb refers to ppb by volume. It will be appreciated that the valve assembly is closed between loading events. It will be understood that the frequency of loading events will vary according to, e.g., the capacity of the feed system and the desired feed rate. Optionally, a feeder body is configured to act as an airlock. Optionally, the feed system comprises a gas purge system, such as a gas purge system for purging pyrolysis gas from at least a portion of the feed system upstream of the plug-forming zone and downstream of the valve assembly. Optionally, the gas purge system is operable to purge pyrolysis gases from at least a portion of the feed system (for example including the first section of the feed conduit), prior to opening the valve assembly to admit feed material, for example by passing an inert gas through at least said portion of the feed system. By way of example, the gas purge system may be configured to purge said pyrolysis gases prior to opening the valve assembly when the light hydrocarbon gas concentration upstream of the plug-forming zone exceeds a pre-determined limit, such as 10 ppm, for example 5 ppm, such as 1 ppm. Additionally or alternatively, the gas purge system may be operable to purge pyrolysis gas and/or oxygen from the release zone of the feed conduit, if present. Optionally, the gas purge system comprises an inert gas supply system, such as a N2 gas supply system. Optionally, the gas purge system is configured to purge said portion of the feed system when at least one of the (i) light hydrocarbon gas concentration, (ii) gas temperature, and (iii) pressure, measured by the sensor system upstream of the plug-forming zone exceeds a pre-defined limit. Additionally or alternatively, the gas purge system is configured to elevate gas pressure upstream of the plug-forming zone, such as in at least the first section of the feed conduit, to a pressure (i) above ambient pressure outside the feed system, and/or (ii) above or equal to pressure in the pyrolysis reactor. It will be appreciated that when gas pressure is so elevated above that in the pyrolysis reactor, detection of a reduction of pressure (rather than an increase) upstream of the plug may be indicative of reduced plug integrity.

Optionally, the feed system comprises a lock hopper assembly for supplying feed material to the inlet of the feed conduit. Optionally, the lock hopper assembly comprises a lock hopper body, a feed material intake valve, a feed material outlet valve, and a gas purge assembly. Optionally, the feed material outlet value is connected to the inlet of the feed conduit, preferably via a feeder body. The feeder body, if present, provides a gas-tight connection between the lock hopper assembly and the inlet of the feed conduit. It will be understood that the valve assembly referred to herein above may be comprised in the lock hopper assembly. For example, one or both of the feed material intake valve and the feed material outlet valve may form the valve assembly. Optionally, the feed material inlet valve is coupled to a catchment hopper. Preferably, the lock hopper body is configured to act as an airlock between the catchment hopper and the feed conduit. Optionally, the lock hopper assembly is disposed vertically above the inlet of the feed conduit, and the catchment hopper (if present) is optionally disposed above the lock hopper assembly. Optionally, the feed material inlet valve and/or the feed material outlet valve is a slide valve. It will be understood that the gas purge assembly of the lock hopper may be the same as, integrated with, or separate to the gas purge system mentioned herein above. The gas purge assembly may comprise any feature described with reference to the gas purge system, and vice versa. Optionally, the sensor system (if present) includes one or more sensors for determining at least one of (i) pyrolysis gas concentration, such as light hydrocarbon gas concentration, and (ii) gas pressure, in the lock hopper. Preferably, the lock hopper assembly is configured so that, in use, feed material is supplied to the feed conduit by the following steps: (i) feed material inlet and outlet valves closed; (ii) optionally, feeder body pressurised with inert gas; (iii) feed material inlet valve opened and feed material moved from catchment hopper to lock hopper body; (iv) feed material inlet valve closed; (v) optionally lock hopper body purged with inert gas and/or optionally pressurised with inert gas; (vi) feed material outlet valve opened and feed material moved from lock hopper body to feeder body; (vii) feed material outlet valve closed; (viii) lock hopper body vented. It may be that when the lock hopper assembly is disposed vertically above the inlet of the feed conduit, feed material moves through the lock hopper assembly, and optionally through the inlet of the feed conduit, under gravity. Optionally, when the lock hopper body has an internal volume LHV, and the feeder body has an internal volume FBV, FBV is greater than LHV, for example 1.2 times greater, such as 1.5 time greater, optionally 2 times greater. When the internal volume of the feeder body is greater than the internal volume of the lock hopper body, all feed material contained in the lock hopper body can be accommodated in the feeder body. Optionally, the feeder body comprises a mechanical agitator, such as an agitator configured to urge feed material towards and/or into the feed conduit. Optionally, the lock hopper body and/or the feeder body comprises at least one sensor, such as a level sensor. It may be that the lock hopper body comprises a maximum level sensor for determining when the lock hopper body is full. Optionally, the step of filling the lock hopper body is discontinued, and/or the step of emptying the lock hopper body is started, when the lock hopper sensor determines that the lock hopper body is full. It may be that the feeder body comprises a minimum level sensor for determining when the feeder body is close to being empty. Optionally, operation of the auger may be discontinued and/or the step of refilling the feeder body may be started, when the sensor determines that the feeder body is close to being empty. It will be understood that any suitable level sensor can be used, such as an optical level sensor.

Optionally, the feed system comprises a drive system, such as a drive motor configured to cause rotation of the auger. For example, it may be that the feed system comprises a drive system coupled to a shaft of the auger. In use, it may be that the drive system is operable to rotate the auger about its longitudinal axis, thereby conveying feed material through the feed conduit. Optionally, the drive system is a variable speed drive system, comprising for example a geared motor unit and/or a variable speed motor. Optionally, the motor has a power of from 10 kW to 50 kW, such as 15 kW to 45 kW, for example 20 kW to 40 kW. Optionally, the drive system comprises a control system for dynamically determining load on the motor. For example, load on the motor may be expressed as a ratio between power usage and rotational speed of the auger. It has been found that as the plug becomes more compacted (and thus a better gas barrier), load on the motor increases.

Optionally, the feed system comprises a control system configured to regulate plug formation in the plug-forming zone by dynamic adjustment of operating parameters, for example in dependence on estimated plug integrity. Optionally, the control system is configured to estimate plug integrity based on information received on any one or more of: (i) pyrolysis gas concentration upstream of the plug-forming zone, (ii) temperature upstream of the plug-forming zone, (iii) gas pressure upstream of the plug-forming zone, and (iv) load on the auger drive system. Optionally, operating parameters adjustable by the control system include any one or more of (i) auger drive system speed, (ii) target temperature of the temperature regulator, if present, (iii) taper angle of the adjustable contracting portion, if present, and (iv) supply of lubricating fluid to the plug-forming zone. Additionally or alternatively, operating parameters adjustable by the control system include position of the feed contacting member of the adjustable contracting portion, if present. It has been found that one or more of (i) decreasing auger drive speed, (ii) decreasing temperature regulator target temperature, (iii) increasing taper angle, and (iv) decreasing supply of lubricating fluid, increases feed material compaction in the plug-forming zone, thereby increasing plug integrity. Additionally, it has been found that moving the position of the feed contacting member into the second, closed position also increases feed material compaction in the plug-forming zone, thereby increasing plug integrity. Optionally, the control system is integrated with the sensor system to provide automated regulation of plug formation.

The present invention provides, according to a second aspect, a pyrolysis reactor assembly comprising a pyrolysis reactor and a feed system according to the first aspect of the invention. Optionally, the pyrolysis reactor is a fluidised bed reactor. Optionally, the outlet of the feed conduit of the feed system is connected to an opening in the reactor, for example wherein the feed system and the reactor are configured so that, in use, feed material exiting the outlet of the feed conduit passes directly into the reactor. It will be appreciated that material passes directly from one vessel to another when it does not pass through an intermediate vessel. For example, it may be that the feed conduit abuts a wall of the reactor. Optionally, the end of the feed conduit adjoining the reactor wall is formed of an insulating connector. Optionally, the pyrolysis reactor comprises an inner reactor shell surrounded by an outer insulation layer having an outer surface, optionally wherein the second end of the feed conduit penetrates the outer insulation layer and/or is joined to the inner reactor shell.

Optionally, the fluidised bed reactor comprises a fluidised bed zone, such as a fluidised bed zone arranged above a distributor zone and below a freeboard zone, for example wherein the reactor is configured so that, in use, particulate material located in the fluidised bed zone is fluidised by a fluid conveyed into the fluidised bed zone via the distributor zone, the fluid exiting the fluidised bed zone, and thus the reactor, via the freeboard zone. It may be that, in use, an upper surface of the fluidised bed defines a boundary between the fluidised bed zone and the freeboard zone. It will be appreciated that, during operation, some of the particulate material may be entrained in fluid passing from the fluidised bed zone into the freeboard zone, and so particulate material may not be wholly confined to the fluidised bed zone. In use, there is typically a net flow of fluidising fluid through the fluidised bed from the distributor zone to the freeboard zone, optionally referred to as the flow direction of the reactor. Typically, the flow direction of a fluidised bed reactor is vertically upwards, for example wherein the fluidised bed zone is disposed directly above the distributor zone and/or the fluidised bed zone is disposed directly below the freeboard zone. Optionally, the fluidised bed reactor comprises a distributor plate in the distributor zone, the distributor plate comprising a plurality of inlets (e.g. nozzles) for supplying fluid into the fluidised bed zone. A suitable fluidised bed reactor and distributor plate is disclosed in PCT Publication No. WO2014/128430A1, the contents of which are fully incorporated herein by reference.

When the pyrolysis reactor has a top, a bottom and at least one side, it may be that the feed system is arranged to supply feed material at the side of the reactor, for example the opening to which the feed conduit is connected is provided in the side of the reactor. Optionally, the feed system is arranged to supply feed material into the freeboard zone of the reactor, for example it may be that the opening to which the feed conduit is connected is located in the freeboard zone of the reactor. Supplying feed material into the freeboard zone may help to maintain a lower temperature in the feed conduit (e.g. because direct contact between hot particulate material and feed material exiting the feed conduit can be avoided). Optionally, the feed system is arranged to supply feed material into the fluidised bed zone of the reactor, for example it may be that the opening to which the feed conduit is connected is located in the fluidised bed zone of the reactor. Supplying feed material directly into the fluidised bed may allow rapid distribution of feed material through the bed. Additionally or alternatively, supplying feed material directly into the fluidised bed may allow the particulate material to assist detachment of feed material from the end of any feed material plug formed in the feed conduit. Optionally, the fluidised bed zone has a bottom (e.g. where the fluidised bed zone meets the distributor zone) and a top (e.g. where the fluidised bed zone meets the freeboard zone), and optionally the feed system is configured to supply feed material into the fluidised bed zone at a position between said bottom and top of the fluidised bed zone. It may be that the fluidised bed is notionally vertically divided into three equal portions, such as a lower portion at its bottom, an upper portion at its top, and a middle portion between the upper and lower portions. It may be that the feed system is configured to supply feed material into the lower portion, the middle portion or the top portion, for example into the middle portion or the lower portion, such as into the lower portion. It may be that, during operation, currents within the fluidised bed cause the particular material to circulate generally upwards in the centre of the reactor, generally outwards at the top of the fluidised bed, generally downwards at the sides of the reactor, and/or generally inwards at the bottom of the fluidised bed. Thus, material fed into the side of the reactor in the middle portion of the fluidised bed zone may be drawn downwards towards the distributor zone, material fed into the side of the reactor in the freeboard zone may be drawn downwards into the fluidised bed, and/or material fed into the side of the reactor in the lower portion of the fluidised bed may be drawn across and upwards into the fluidised bed.

Optionally, the feed system is configured to continuously supply feed material to the pyrolysis reactor. In other words, it may be that the feed system is operable as a continuous feed system. Optionally, the feed system is configured to supply to the pyrolysis reactor solid carbonaceous material selected from plastic waste, municipal waste and biomass, for example mixed plastic waste. It will be appreciated that while plastic waste feed material may be understood to behave as a solid mass of mixed plastic waste, the solid mixed plastic waste may, for example, include a minor component of molten plastic, such as plastic that melts at a temperature at or below the operating temperature of the feed system.

Optionally, the pyrolysis reactor assembly comprises a dual reactor system, wherein the assembly comprises a fluidised bed pyrolysis reactor configured to contain, in use, a fluidised bed of particulate material, and a combustion reactor configured to heat and/or regenerate the particulate material. In such a system, the pyrolysis reactor and the combustion reactor work in tandem, with the particulate material circulated between the pyrolysis reactor and the combustion reactor. Any appropriate mechanism for transferring particulate material between the reactors may be employed. During use, particulate material in the pyrolysis reactor may become contaminated with char and/or cooled by contact with the feed material, especially when the feed material is mixed plastic waste. To avoid a build-up of char in the pyrolysis reactor, and/or to maintain the temperature of the pyrolysis reactor, particulate material is transferred to the combustion reactor where the char, and optionally a fuel, is burnt, thereby cleaning and heating the particulate material. Particulate material so withdrawn from the pyrolysis reactor is referred to herein as spent particulate material. Particulate material so returned to the pyrolysis reactor is referred to herein as regenerated particulate material. Optionally, the combustion reactor is configured to operate at a temperature of at least 750° C., for example at least 850° C. A high temperature may be desirable in the combustion reactor to adequately burn char (especially when the feed material is mixed plastic waste) and/or to allow for heat loss as regenerated particulate material is returned to the pyrolysis reactor. Optionally, the combustion reactor is a fluidised bed combustion reactor.

Optionally, the pyrolysis reactor assembly is comprised in a waste recycling apparatus, the apparatus being configured to convert waste to a pyrolysis product, for example wherein the waste is selected from plastic waste, municipal waste and/or biomass, preferably mixed plastic waste. Optionally, the pyrolysis product comprises a hydrocarbon gas, a hydrocarbon liquid/oil, a hydrocarbon solid/wax, and/or a mixture thereof. Optionally, the apparatus comprises a shredder, a dryer and/or a blower for shredding, drying and/or conveying the waste material prior to feeding the waste to the pyrolysis reactor with the feed system.

According to a third aspect, the present invention provides a method of supplying a feed material to a pyrolysis reactor with a feed system. The feed system comprises a feed conduit having an inlet for receiving the feed material, and an outlet for discharging the feed material into the reactor. The feed conduit has a first section comprising the inlet and a second section comprising the outlet, the first section accommodating an auger, and the second section comprising at least one plug forming zone. The method comprises operating the auger to convey feed material from the inlet towards the outlet and to discharge the feed material into the second section. Discharging of the feed material into the second section causes the feed material to accumulate into a plug of feed material in the plug forming zone, thereby forming a gas barrier that inhibits flow of gas into or out of the pyrolysis reactor through the feed conduit.

Optionally, the method comprises operating a temperature regulator to control the temperature of at least the second section of the feed conduit, such as to maintain at least the second section of the feed conduit at a temperature of from 20° C. to 80° C. Optionally, the method comprises operating the temperature regulator in (i) a cooling mode to cool at least the second section of the feed conduit, and (ii) a heating mode to heat at least the second section of the feed conduit. Additionally or alternatively, the method comprises operating the temperature regulator in (i) a high capacity cooling mode to maintain at least the second section of the feed conduit at a temperature $T_1$, and (ii) a low capacity cooling mode to maintain at least the second section of the feed conduit at a temperature $T_2$, wherein $T_2$ is greater than $T_1$, such as at least 10° C. greater, such as at least 25° C. greater, optionally at least 50° C. greater. Optionally, $T_1$ is at least 20° C. and/or T2 is less than 80° C. It will be appreciated that the cooling/heating modes, and/or the low capacity/high capacity modes may be operated in any order. Optionally, the method comprise operating the feed system in a first start-up mode, wherein the temperature regulator is operated to maintain the temperature T2, and subsequently operating the temperature regulator to maintain the temperature at T1. Temperature may be maintained at temperature T2 by operating the temperature regulator in a low capacity mode (e.g. when the pyrolysis reactor is at operating temperature), or in a heating mode (e.g. when the pyrolysis reactor is below operating temperature and/or the when the feed conduit comprises an insulating connector). Temperature may be maintained at temperature T1 by operating the temperature regulator in a high capacity mode or in a cooling mode.

Optionally, the method comprises continuously feeding feed material into the pyrolysis reactor. Optionally, the method comprises operating the auger to supply feed material into the reactor at a pre-defined supply rate, such as a rate of from 100 to 3000 kg/hr, such as 250 to 2500 kg/hr, for example 500 to 1250 kg/hr Optionally, the auger is operated by a drive system. Optionally, the method comprises determining the load placed on the drive system. Load on the drive system may be determined by measuring the power required to maintain a rotation rate effective to deliver feed material at a pre-defined supply rate. It will be appreciated that friction between the plug of feed material and the side walls of the feed conduit increases load on the drive system.

Optionally, the second section comprises at least one adjustable contracting and/or expanding portion, and the method comprises adjusting a taper angle of the contracting/expanding portion to promote or hinder plug formation/plug disintegration.

Optionally, the second section comprises at least one adjustable contracting portion comprising a movable feed contacting member, and the method comprises adjusting a position of the movable feed contacting member to control plug formation. For example, the method comprises moving the feed contacting member between the first, open position and the second, closed position.

Optionally, the second section comprises at least one fluid inlet and/or at least one fluid outlet separate to the feed inlet and feed outlet and located upstream of the plug forming zone, wherein the method comprises supplying a fluid, such as a lubricating fluid, into the second section via said at least one fluid inlet and/or withdrawing a fluid, such as a hydrocarbon gas, from second section via said at least one fluid outlet. Optionally, the lubricating fluid comprises a portion of the pyrolysis product. Optionally, the method comprises supplying lubricating fluid in response to load on the auger drive system.

Optionally, the feed system comprises a valve assembly upstream of the plug-forming zone, wherein the method comprises operating a portion of the feed system between the plug-forming zone and the valve assembly as an air-lock. Optionally, the method comprises operating a gas purge system to purge pyrolysis gases from said portion of the feed system prior to opening the valve assembly to admit feed material into the feed conduit, such as by flushing said portion with an inert gas. Optionally, the method comprises purging said portion when the light hydrocarbon gas concentration in said portion exceeds a pre-determined limit, such as 10 ppm, for example 5 ppm, such as 1 ppm.

Optionally, the feed system comprises a sensor system for directly or indirectly detecting pyrolysis gas upstream of the plug forming zone, and the method comprises adjusting at least one operating parameter selected from (a) the temperature of at least the second section of the feed conduit, (b) the operating rate of the auger, (c) taper angle of the adjustable contracting portion, if present and variable, and (d) supply of lubricating fluid to the plug-forming zone, in dependence on detection of pyrolysis gas by the sensor system, for example in dependence on the level of pyrolysis gas so detected. Additionally or alternatively, the method comprises adjusting operating parameter (e) the position of the feed contacting member of the adjustable contracting portion, if present and variable. Preferably, the method comprises adjusting at said at least one operating parameter to maintain (i) a light hydrocarbon gas concentration upstream of the plug forming zone at a level of no more than 100 ppm, such as no more than 50 ppm, for example no more than 10 ppm, (ii) a gas temperature upstream of the plug-forming zone at a level of no more than 150° C., such as no more than 100° C., for example no more than 50° C., and/or (iii) a pressure upstream of the plug-forming zone of no more than 200 mbarg, such as no more than 150 mbarg, for example no more than 50 mbarg. Optionally, the method comprises operating a control system to regulate plug formation in the plug-forming zone by dynamically adjusting said operating parameter(s) in response to estimated plug integrity. Optionally, the method comprises operating the control system to automatically regulate plug formation in response to data received from a sensor system.

Optionally, the second section comprises a first plug forming zone, a second plug forming zone, and a release zone disposed between the first plug forming zone and the second plug forming zone, wherein discharging of the feed material into the second section by the auger causes the feed material to accumulate into a first plug of feed material in the first plug forming zone, disperse in the release zone, and then accumulate into a second plug of feed material in the second plug forming zone. The first and second plugs form gas barriers that inhibit flow of gas along the feed conduit. Optionally, the second section comprises at least one fluid inlet and/or at least one fluid outlet in the release zone, optionally wherein the method comprises supplying a fluid, such as a lubricating fluid, into the second section via said at least one fluid inlet and/or withdrawing a fluid, such as a hydrocarbon gas, from the release zone via said at least one fluid outlet. Optionally, the method comprises supplying an inert gas (as used herein, an inert gas may be a gas having an oxygen content of no more than 0.002%, for example N2) into the release zone via said at least one fluid inlet. Optionally, the method comprises purging the release zone by withdrawing a hydrocarbon gas through the at least one fluid outlet and supplying a substantially inert gas via the at least one fluid inlet. Optionally, the method comprises adjusting at least one of (a) the temperature of at least the second section of the feed conduit, (b) the speed of the auger, (c) the taper angle of an adjustable contracting portion, if present, and (d) the supply of lubricating fluid to the release zone. Additionally or alternatively, the method comprises adjusting operating parameter (e) the position of the feed contacting member of the adjustable contracting portion, if present. Optionally, when the feed system comprises a gas sensor (e.g. for detecting pyrolysis gas and/or oxygen), and/or a pressure sensor, and/or a temperature sensor in the release zone, said adjustments are performed in dependence on the gas level, pressure and/or temperature measured by the sensor(s).

Optionally, the method comprises utilizing a lock hopper assembly to supply feed material to the auger, for example via a feed material inlet through which the auger receives feed material. Optionally, the lock hopper assembly comprises a lock hopper body, a feed material intake valve, a feed material outlet valve, and a gas purge assembly. Optionally, the feed material outlet valve is connected to the inlet through which the auger receives feed material, preferably via a feeder body, preferably wherein the feeder body provides a gas-tight connection between the lock hopper assembly and said inlet. Optionally, the feed material inlet valve is coupled to a catchment hopper. Optionally, the method comprises the following steps: (i) closing the feed material inlet and outlet valves; (ii) optionally pressurising the feeder body with inert gas; (iii) opening the feed material inlet valve and moving feed material from the catchment hopper to the lock hopper body; (iv) closing the feed material inlet valve; (v) optionally purging and optionally pressurising the lock hopper body with inert gas; (vi) opening the feed material outlet valve and moving feed material from the lock hopper body to the feeder body; (vii) closing the feed material outlet valve; (viii) optionally venting the lock hopper body, for example via an exhaust. Optionally, the method comprises gravity feeding the feed material to the auger, for example wherein the method comprises one or more of: (a) gravity feeding the feed material from the catchment hopper to the lock hopper body; (b) gravity feeding the feed material from the lock hopper body to the feeder body, and (c) gravity feeding the feed material from the feeder body to auger. The lock hopper assembly may provide a complementary mechanism for avoiding flow of unwanted gases into or out of the pyrolysis reactor through the feed conduit. For example, where the plug of feed material is not entirely gas-tight, venting and/or purging the lock hopper body may provide a convenient method of further inhibiting gas flow into or out of the pyrolysis reactor. On the other hand, where the plug of feed material is entirely gas-tight, venting and/or purging the lock hopper body may not be necessary. Optionally, when the second section comprises a release zone connected to a gas sensor, the lock hopper may be operated in dependence on the level of gases (e.g. hydrocarbon gas and/or oxygen) detected in the release zone. For example, one or more of steps (ii), (v) and (viii) may be reduced in duration or omitted if no or negligible levels of such gases is detected in the release zone. On the other hand, one or more of steps (ii), (v), and (viii) may be extended or introduced if the level of such gases is found to increase.

Optionally, the feed material is mixed plastic waste, such as shredded mixed plastic waste. Optionally, the method comprises a step of shredding mixed plastic waste to form a shredded mixed plastic waste, the shredded mixed plastic waste being supplied to the auger. Optionally, the mixed plastic waste is shredded until is passes through a screen having a mesh size of from 20-50 mm, such as about 30 mm. Optionally, the method comprises a step of operating a dryer to reduce the moisture content of the optionally shredded mixed plastic waste. Optionally, the method comprises a step of utilizing a blower to transport mixed plastic waste, such as shredded plastic waste to a hopper, such as the catchment hopper (if present). Optionally, the method comprises operating a disengagement device (such as a cyclone) to control collection of blown mixed plastic waste in a hopper, such as the catchment hopper (if present).

Optionally, the method comprises operating a feed system according to the first aspect of the invention.

The present invention provides, according to a fourth aspect, a method of pyrolysing a feed material, wherein the method comprises operating a pyrolysis reactor to convert feed material to a pyrolysis product, wherein the method comprises supplying the feed material to the pyrolysis reactor by a method according to the third aspect of the invention. Optionally, the feed material is selected from plastic waste, municipal waste and/or biomass, preferably mixed plastic waste. Thus, the fourth aspect of the invention may provide a method of recycling waste by pyrolysis of the waste to form a pyrolysis product. Optionally, the pyrolysis reactor is a fluidised bed pyrolysis reactor having a fluidised bed zone. Optionally, the method comprises operating the feed system to convey the feed material directly into the fluidised bed zone of the pyrolysis reactor via the outlet of the feed conduit. Optionally, the method comprises operating the pyrolysis reactor to convert the waste to a pyrolysis product, such as a hydrocarbon gas, a hydrocarbon liquid/oil, a hydrocarbon solid/wax, and/or a mixture thereof. Optionally, the method comprises converting the waste to a pyrolysis product gas, optionally cleaning the pyrolysis product gas using a hot gas filter, and condensing the pyrolysis product gas to form the pyrolysis product.

According to a fifth aspect, the present invention provides an adjustable contracting and/or expanding portion for use with a feed conduit, for example a feed conduit of a feed system according to the first aspect of the invention.

The adjustable contracting and/or expanding portion of the fifth aspect of the invention may comprise a feed contacting member. In use, the feed contacting member may be movable (i) towards and (ii) away from the longitudinal axis of the feed conduit (e.g. the longitudinal axis of the second section of the feed conduit). Optionally, the feed contacting member is movable along an axis nonparallel with the longitudinal axis of the feed portion. Optionally, said axis is perpendicular to the longitudinal axis of the feed portion. Alternatively, said axis is oblique to the longitudinal axis of the feed portion. Optionally, the feed contacting member is in the form of a piston extendable into the second section of the feed conduit. Optionally, the adjustable contracting and/or expanding portion is an adjustable contracting portion. Preferably, the adjustable contracting portion, and the feed contacting member, are as described in relation to the first aspect of the invention.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 2 shows a schematic view of a fluidised bed pyrolysis reactor and a feed system according to another embodiment of the invention;

FIG. 3 shows a schematic view of a fluidised bed pyrolysis reactor and a feed system according to another embodiment of the invention;

FIGS. 4a and 4b show schematic views of a feed system according to another embodiment of the invention with and without feed material present;

FIGS. 5a and 5b show schematic views of a feed system according to another embodiment of the invention with and without feed material present;

FIGS. 6a and 6b show schematic views of a feed system according to another embodiment of the invention with and without feed material present;

FIGS. 7a and 7b show schematic views of a feed system according to another embodiment of the invention with and without feed material present;

FIG. 8b shows an enlarged view of the feed conduit of the feed system of FIG. 8a;

DETAILED DESCRIPTION

Figure 1:
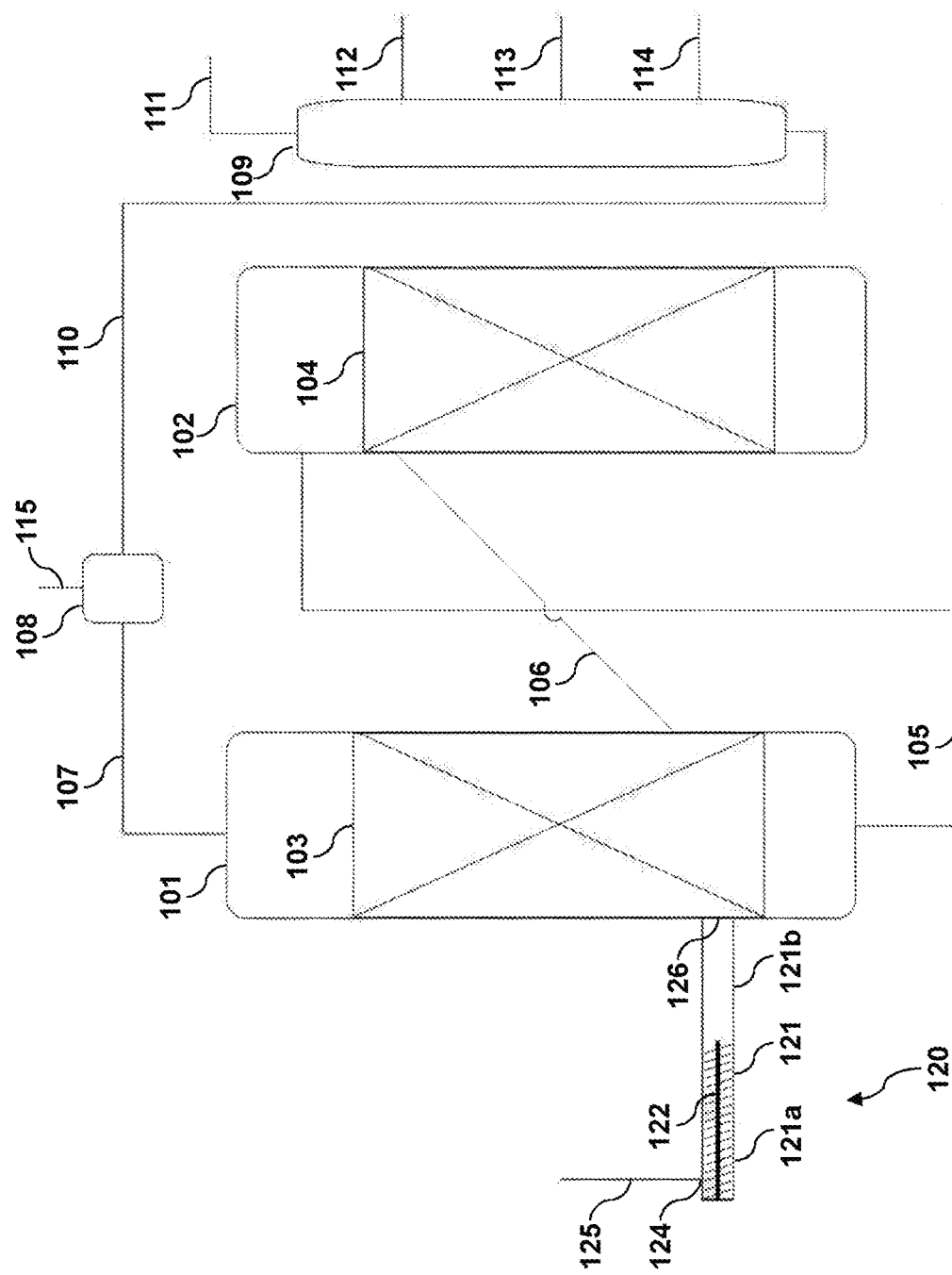
FIG. 1 shows a schematic view of a dual fluidised bed pyrolysis apparatus comprising a feed system according to an embodiment of the invention.

In FIG. 1, a pyrolysis reactor assembly comprises a fluidised bed pyrolysis reactor 101, and a fluidised bed combustion reactor 102. The fluidised bed pyrolysis reactor 101 comprises a fluidised bed zone 103, and the fluidised bed combustion reactor comprises a fluidised bed zone 104. During use, each fluidised bed zone 103, 104 contains a fluidised bed or particulate material, the particulate material being fluidised by injection of fluidising gas into the pyrolysis reactor 101 and the combustion reactor 102 via fluidising gas lines and fluidising gas distributors (not shown in FIG. 1). Any suitable fluidising gas distributor may be used with the reactor assembly. During use, spent particulate material is collected from the bottom of the pyrolysis reactor 101 and fed to combustion reactor 102 via withdrawal line 105. Optionally, the spent particulate material is conveyed upwards to an upper portion of the combustion reactor 102 as it travels along withdrawal line 105. The withdrawal line 105 may include any suitable apparatus for elevating the particulate material, such as a mechanical (e.g. a screw conveyer or a pneumatic conveyer). Regenerated particulate material is returned from combustion reactor 102 to pyrolysis reactor 101 via return line 106. Return line 106 may be configured to allow regenerated particulate material to return to pyrolysis reactor 101 under gravity, and/or may comprise any suitable conveying apparatus (such as a screw conveyer or a pneumatic conveyer). During use, feed material is pyrolysed in the pyrolysis reactor 101 to form a pyrolysis product gas. The pyrolysis product gas is withdrawn from the top of the pyrolysis reactor 101 via line 107, and then passed through a cleaning device 108 (which may be a hot gas filter) which separates unwanted contaminants from the pyrolysis product gas via line 115. The cleaned pyrolysis product gas is then passed to a condenser assembly 109 via line 110. Condenser assembly 109 separates the pyrolysis product gas into a plurality of fractions, each separately collected via lines 111, 112, 113 and 114. The use of condenser assembly is optional, and it will be appreciated that the pyrolysis product may be separated into any number of fractions, depending on the requirements of the operator.

Feed material, which may be mixed plastic waste, is supplied into the pyrolysis reactor 101 via a feed system 120. The feed system 120 comprises a feed conduit 121 having a first section 121a and a second section 121b. An auger 122 is provided in the first section 121a. In use, feed material is supplied to an inlet 124 of the feed conduit 121 via line 125, and then conveyed through the first section 121a of the feed conduit 121 by operation of the auger 122. As the auger 122 continues to convey feed material to the second section 121b of the feed conduit 121, the feed material is urged through the second section 121b, accumulating into a plug of feed material that acts to provide a gas-tight seal between the pyrolysis reactor 101 and the inlet 124. When the feed material reaches the distal end of the second section 121, it discharges into the pyrolysis reactor 101 through outlet 126. The feed conduit 121 may include a temperature regulator for controlling the temperature of at least the second section 121b, and/or an insulating section (e.g. an insulating connector) at the outlet (not shown in FIG. 1). Such a temperature regulator and/or insulating section may help to reduce conduction of heat from the pyrolysis reactor along the feed conduit 121b where such temperature conduction is undesirable (which may be the case, for example, when the feed material is mixed plastic waste).

In FIG. 2, a fluidised bed pyrolysis reactor 201 and a feed system 202 are shown according to an embodiment of the invention. The fluidised bed pyrolysis reactor 201 comprises a fluidised bed zone 203. During use, particulate material is fluidised by injection of fluidising gas via fluidising gas line 204 and fluidising gas distributor 205. Feed material, which may be mixed plastic waste, is supplied into the pyrolysis reactor 201 via a feed system 202. The feed system 202 comprises a feed conduit 206 having a first section 206a and a second section 206b. An auger 207 is provided in the first section 206a. In use, feed material is supplied to an inlet 208 of the feed conduit 206 via hopper 209 (which may be a lock hopper), and then conveyed through the first section 206a of the feed conduit 206 by operation of the auger 207. As the auger 207 continues to convey feed material to the second section 206b of the feed conduit 206, the feed material is urged through the second section 206b, accumulating into a plug of feed material that acts to provide a gas-tight seal between the pyrolysis reactor 201 and the inlet 208. When the feed material reaches the distal end of the second section 206b, it discharges into the pyrolysis reactor 201 through outlet 210. The feed conduit 206 includes an insulating connector 211 at the outlet 210. The pyrolysis reactor 201 comprises an inner reactor shell 212 surrounded by an outer insulation layer 213 having an outer surface 214, wherein the second end of the feed conduit 206 extends beyond the outer surface 214 of the outer insulation layer 213 towards the inner reactor shell 212. The second end of the feed conduit 206b penetrates the outer insulation layer 213 and is joined to the reactor shell 212. In the embodiment shown in FIG. 2, the part of the feed conduit 206 that penetrates the outer insulation layer 213 is formed by the insulating connector 211.

The outlet 210 of the feed conduit 206 is defined by insulating connector 211. Optionally, the insulating connector 211 is made from a ceramic material. The insulating connector 211 helps to reduce conduction of heat from the pyrolysis reactor 201 along the feed conduit 206. The insulating connector 211 helps prevent conduction of heat by the feed conduit 206.

In FIG. 3, a fluidised bed pyrolysis reactor 301 and a feed system 302 are shown according to another embodiment of the invention. The reactor 301 comprises a fluidised bed zone 303, fluidising gas line 304 and fluidising gas distributor 305. A feed system 302 is provided comprising a feed conduit 306 having first and second sections 306a, 306b and an inlet 308 and an outlet 310, an auger 307 in the first section 306a, and a feed hopper 309 connected to the inlet 308. In use, feed material accumulates into a gas-tight plug in the second section 306b. The feed conduit 306 includes a temperature regulator 311, for controlling the temperature of the second section 306b. The temperature regulator 311 is a fluid-filled heating and cooling jacket having an inlet 320 and an outlet 321 connected to a heating/cooling fluid supply system (not shown in FIG. 3). The heating/cooling fluid may be water or oil. The heating/cooling fluid supply system comprises a fluid heater/cooler and a pump for circulating the fluid through the heating/cooling jacket. The pyrolysis reactor 301 comprises an inner reactor shell 312 surrounded by an outer insulation layer 313 having an outer surface 314. The end of the feed conduit 306 and the temperature regulator 311 extend beyond the outer surface 314 of the outer insulation layer 313 towards the inner reactor shell 312, with the end of the feed conduit 306b being joined to the reactor shell 312. The temperature regulator 311 is operable to cool the second section 306b of the feed conduit 306, thereby reducing conduction of heat along the conduit 206 from the pyrolysis reactor 301. The cooling capacity of the temperature regulator is adjusted by varying the rate of supply of fluid to the jacket and/or by varying the temperature of the fluid. The temperature regulator 311 can also be operated to heat the second section 306b of the feed conduit 306b by supply of heated fluid to the jacket.

In FIG. 4a, a feed system 401 is shown empty of feed material, the feed system 401 comprising a feed conduit 402 having first and second sections 402a, 402b and an inlet 405 and an outlet 407, an auger 403 in the first section 402a, and a feed material hopper 406 connected to the inlet 405. The outlet 407 is provided for discharging feed material directly into a pyrolysis reactor 404 (only a section of the wall of reactor 404 is shown in FIG. 4a). The feed conduit 402 is linear, defining a straight internal bore. The inlet 405 is provided in the top of the conduit side-wall (at a position vertically above the auger 403), thereby allowing feed material to fall into the feed conduit 402 under gravity. The feed conduit 402 is open-ended at the outlet 407, thereby allowing feed material to exit in a direction parallel to the longitudinal axis of the feed conduit 402. The internal diameter of the second section 402b is substantially constant along its entire length.

In FIG. 4b, the feed system 401 of FIG. 4a is shown in use and containing feed material 408. Features shown in FIG. 4b that correspond to features shown in FIG. 4a are provided with the same reference numerals. During use, feed material 408 collected in the hopper 406 drops into the feed conduit 402 through the inlet 405, and is then conveyed through the first section 402a of the feed conduit 402 by operation of the auger 403. As the auger 403 continues to convey feed material 408 to the second section 402b of the feed conduit 402, the feed material 408 is urged through the second section 402b, accumulating into a plug of feed material 409 that provides a gas-tight seal between the pyrolysis reactor 404 and the inlet 405. When the feed material reaches the distal end of the second section 402b, it discharges into the pyrolysis reactor 404 through outlet 407. For clarity, FIG. 4b does not show feed material 408 being conveyed along the length of the auger 403. As shown in FIG. 4b, the density of feed material 408 in the second section 402b of the conduit 402 varies along the length of the section. At the end of the second section 402b adjacent the auger 403, the density of feed material 408 is relatively low. As the feed material 408 accumulates in the second section 402b, it is pushed through the second section 402b towards the pyrolysis reactor 404. Friction with the internal walls of the feed conduit 402 resists movement of the feed material 408 through the second section 402b, causing feed material 408 to compact. The compaction forces more feed material 408 into contact with the internal wall of the conduit 402, thereby further increasing friction. The ever increasing friction and compaction cause the feed material 408 to form the plug 409. When the feed material 408 reaches the outlet 407 of the feed conduit 402, that friction is lost, thereby allowing the plug 409 to disintegrate. Heat from the pyrolysis reactor 404 also melts feed material 408 on the end of the plug 409 (particularly when the feed material 408 is plastic waste). The combined mechanical and thermal disintegration of the plug 409 is thought to give the downstream end of the plug 409 a concave surface, resulting in the gas-tight seal formed by the plug 409 being located some distance upstream of the outlet 407. The length:diameter ratio of the second section 402b is important to the establishment of an effective, gas-tight plug 409. An appropriate length:diameter ratio should be chosen in dependence on the nature of the feed material 408, and optionally on the operating temperature of the second section of the feed conduit 402b.

In FIG. 5a, a feed system 501 is shown empty of feed material, the feed system 501 comprising a feed conduit 502 having first and second sections 502a, 502b and an inlet 505 and an outlet 507, an auger 503 in the first section 502a, and a feed material hopper 506 connected to the inlet 505. The outlet 507 is provided for discharging feed material directly into a pyrolysis reactor 504 (only a section of the wall of reactor 504 is shown in FIG. 5a). As in the feed system 401 of FIGS. 4a and 4b, the feed conduit 502 is linear, the inlet 505 is provided in the top of the conduit side-wall, and the feed conduit 502 is open-ended at the second end. The internal diameter of the second section 502b varies along its length, comprising a tapered contracting portion 510. The tapering angle is exaggerated for clarity.

In FIG. 5b, the feed system 501 of FIG. 5a is shown in use and containing feed material 508. Features shown in FIG. 5b that correspond to features shown in FIG. 5a are provided with the same reference numerals. Feed material is collected in the hopper 506 and conveyed through the conduit 402 in much the same manner as in the feed system 401 of Figure 4b. The tapered contracting portion 510 assists in forming the plug of feed material 509 by compacting feed material and increasing flow resistance, and helps control its location.

In FIG. 6a, a feed system 601 is shown empty of feed material, the feed system 601 comprising a feed conduit 602 having first and second sections 602a, 602b and an inlet 605 and an outlet 607, an auger 603 in the first section 602a, and a feed material hopper 606 connected to the inlet 605. The outlet 607 discharges feed material directly into a pyrolysis reactor 604 (only a section of the wall of reactor 604 is shown in FIG. 6a). As for the feed system 501 of FIGS. 5a and 5b, the feed conduit 602 is linear the inlet 605 is provided in the top of the conduit side-wall, and the feed conduit 602 is open-ended at the second end. The internal diameter of the second section 602b varies along its length, the second section 602b having a first contracting tapered portion 610, a second contracting tapered portion 611, and an expanding stepped portion 612 between the first and second contracting tapered portions 610, 611. Thus, the second section 602b comprises two plug forming zones (defined by the downstream ends of the first and second contracting tapered portions 610, 611), and a release zone (defined by the outwardly stepped portion 612 and the upstream end of the second contracting tapered portion 611). The tapering angles and dimensions of the release zone are exaggerated for clarity. The second section 602b comprises a fluid inlet 613 and a fluid outlet 614 in the release zone. Hydrocarbon and oxygen gas sensors (not shown in FIGS. 6a and 6b) are connected to the fluid outlet for detecting gas in the release zone. The fluid inlet and outlet 613, 614 are operable to purge the release zone in the event that hydrocarbon gas and/or oxygen gas is detected in the release zone. For example, the release zone may be flushed with a continuous supply of an inert gas such as nitrogen when hydrocarbon gas and/or oxygen gas is detected.

In FIG. 6b, the feed system 601 of FIG. 6a is shown in use and containing feed material 608. Features shown in FIG. 6b that correspond to features shown in FIG. 6a are provided with the same reference numerals. Feed material is collected in the hopper 606 and conveyed through the conduit 602 in much the same manner as in the feed system 601 of FIG. 6b. As feed material 608 moves through the first contracting tapered portion 610, the decreasing internal diameter of the conduit 602 increases the flow resistance, causing feed material 608 to compact further. The compaction forces more feed material 608 into contact with the internal wall of the conduit 602, thereby further increasing friction. The ever increasing friction and compaction cause the feed material 608 to form the first plug 609a in the first plug forming zone, thereby providing a first gas-tight seal. When the feed material 608 reaches the expanding stepped portion 612 of the feed conduit 602, some of that friction is lost, and the plug experiences a decrease in compressive force from the sidewalls of the conduit, thereby allowing the plug 609a to disintegrate as it exits the first contracting tapered portion 610 into the release zone. Mechanical disintegration of the first plug 609a is thought to give the downstream end of the plug 609a a concave surface, resulting in the gas-tight seal formed by the first plug 609a being located some distance upstream of the downstream end of the first contracting tapered portion 610. As feed material 608 continues to be supplied into the release zone, it again accumulates and moves through the second contracting tapered portion 611, the decreasing internal diameter of which increases the flow resistance again. This causes the feed material 608 to form the second plug 609b in the second plug forming zone, thereby forming a second gas-tight seal downstream of the first gas-tight seal. When the feed material 608 nears the outlet 607 of the feed conduit 602, the friction again reduces, thereby allowing the second plug 609b to disintegrate. As in the case of the first plug 609a, the second plug 609b is thought to have a concave downstream surface, resulting in the gas-tight seal formed by the first plug 609a being located some distance upstream of the outlet 607. The two plugs provide a more reliable and resilient barrier to gases exiting or entering the pyrolysis reactor 604 via the feed conduit 602, while the release zone provides a possibility of monitoring the effectiveness of the gas-tight seal at a position that is reasonably well isolated from both the pyrolysis reactor and the outside environment.

In FIG. 7a, a feed system 701 is shown empty of feed material, the feed system 701 comprising a feed conduit 702 having first and second sections 702a, 702b and an inlet 705 and an outlet 707, an auger 703 in the first section 702a, and a feed material hopper 706 connected to the inlet 705. The outlet 707 is provided for discharging feed material directly into a pyrolysis reactor 704 (only a section of the wall of reactor 704 is shown in FIG. 7a). As in the feed system 601 of FIGS. 6a and 6b, the feed conduit 702 is linear, the inlet 705 is provided in the top of the conduit side-wall, and the feed conduit 702 is open-ended at the outlet. The internal diameter of the second section 702b varies along its length, the second section 702b having a first constant diameter portion 710, a second constant diameter portion 711 downstream of the first constant diameter portion 710, and an expanding stepped portion 712 disposed between the first and second constant diameter portions 710, 711. The second section 702b further comprises a third constant diameter portion 715 downstream of the second constant diameter portion 711, and a contracting stepped portion 716 disposed between the second and third constant diameter portions. The first constant diameter portion 710 defines a first plug forming zone, the second constant diameter portion 711 defines a release zone, and the third constant diameter portion defines a second plug forming zone. A fluid inlet 713 and a fluid outlet 714 are provided in the release zone.

In FIG. 7b, the feed system 701 of FIG. 7a is shown in use and containing feed material 708. Features shown in FIG. 7b that correspond to features shown in FIG. 7a are provided with the same reference numerals. Feed material is collected in the hopper 706 and conveyed through the conduit 702 in much the same manner as in the feed system 701 of FIG. 7b and the manner in which plugs of feed material form and disperse in the feed system 701 of FIG. 7b is largely equivalent to the manner in which plugs form and disperse in the feed system 601 of FIG. 6b. Hydrocarbon and oxygen gas sensors (not shown in FIGS. 7a and 7b) are connected to the fluid outlet for detecting gas in the release zone.

Figure 8A:
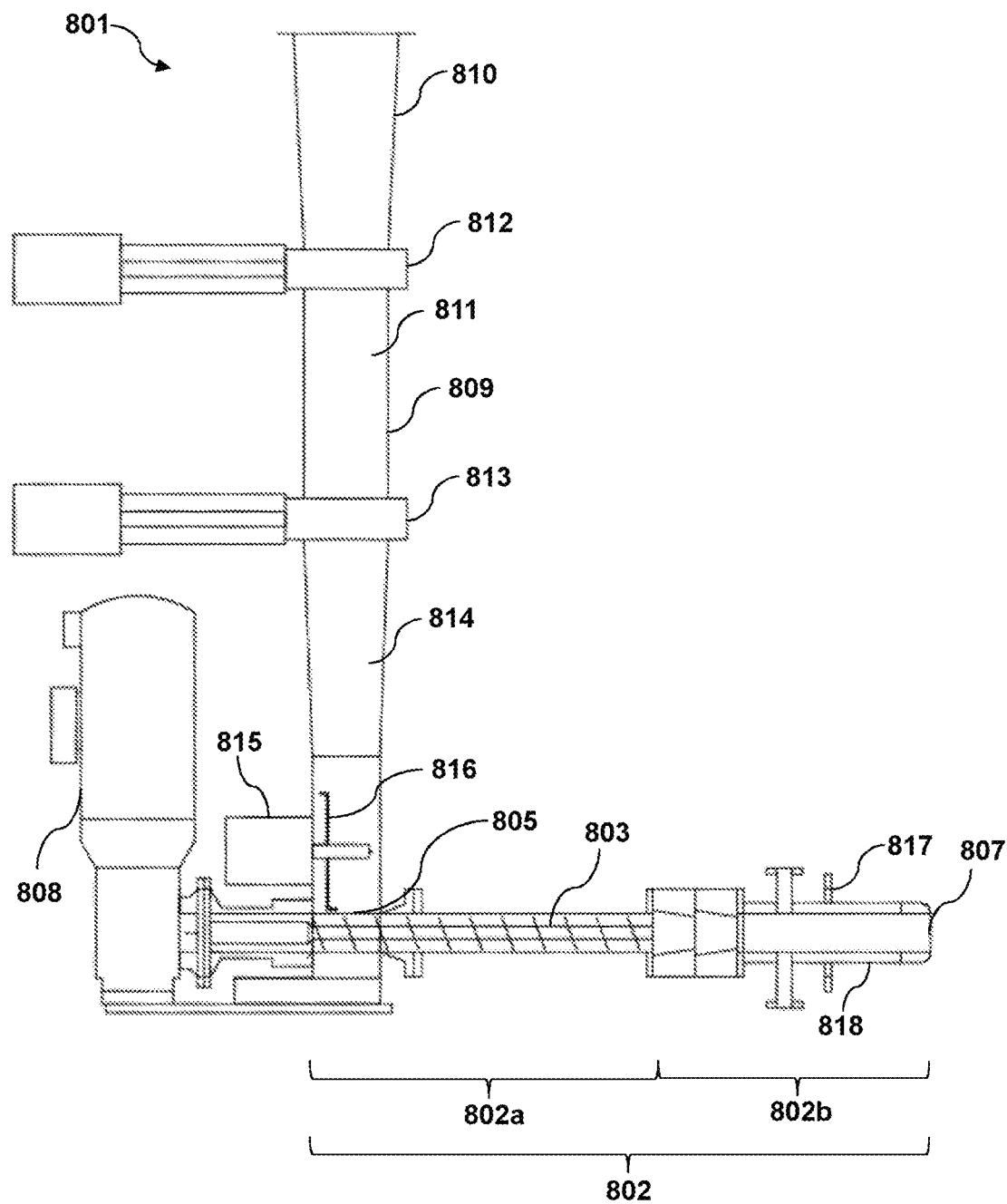
FIG. 8a shows a side view of a feed system comprising a lock hopper assembly according to another embodiment of the invention.

FIG. 8a shows a side view of a feed system 801 comprising a lock hopper assembly 809 according to an embodiment of the invention. The feed system 801 comprises a feed conduit 802 (shown as a cross-sectional view) having an inlet 805 for receiving the feed material, and an outlet 807 for discharging the feed material into a reactor, the feed conduit 802 having first and second sections 802a, 802b. An auger 803 is accommodated in the first section 802b. A flange 817 is provided to attach the feed system 801 to a corresponding bracket on the pyrolysis reactor. The bracket may be provided external to the reactor insulation, with the section of the feed conduit 802 downstream of the flange 817 arranged to penetrate the reactor insulation and terminate at the inner reactor wall when the feed system 801 is connected to the reactor. The feed conduit 802 also includes a temperature regulator 818 for controlling the temperature of the second section 802b. The feed system 801 comprises a variable speed drive system 808 including an electrical drive motor for rotating the auger 803 about its longitudinal axis, thereby conveying feed material through the feed conduit 802.

The feed system 801 further comprises a lock hopper assembly 809 for supplying feed material to the inlet 805 of the feed conduit 802, the lock hopper assembly 809 comprising a catchment hopper 810, a lock hopper body 811, a feed material inlet slide valve 812, a feed material outlet slide valve 813, and a gas purge assembly (not shown). The feed material outlet value 813 is connected to the inlet 805 of the feed conduit 802 via a feeder body 814. In use, the lock hopper body 811 acts as an airlock between the catchment hopper 810 and the feed conduit 802. The lock hopper assembly 809 is disposed vertically above the inlet 805 of the feed conduit 802, and the catchment hopper 810 is disposed vertically above the lock hopper assembly 809. The gas purge assembly (not shown) comprises a N₂ gas supply system which is operable to raise the pressure inside the feeder body 814 above ambient pressure, and to above the pressure inside the pyrolysis reactor. The feeder body 814 comprises a gas sensor (not shown) for detecting hydrocarbon gas. The presence of hydrocarbon gas in the feeder body 814 indicates an imperfect seal between the pyrolysis reactor and the feeder body 814. In use, the lock hopper assembly 809 is operated by (i) closing the feed material inlet valve 812 and outlet valve 813; (ii) optionally pressurising the feeder body 814 with inert gas; (iii) opening the feed material inlet valve 812 and allowing feed material to fall from the catchment hopper 810 into the lock hopper body 811; (iv) closing the feed material inlet valve 812; (v) optionally purging and optionally pressurising the lock hopper body 811 with inert gas; (vi) opening the feed material outlet valve 813 and allowing feed material to fall from the lock hopper body 811 into the feeder body 814; (vii) closing the feed material outlet valve 813; and, (viii) optionally venting the lock hopper body 811. Each of steps (ii), (v) and (viii) is operated in dependence on the level of hydrocarbon gas detected by the sensor in the feeder body 814. The internal volume of the feeder body 814 is greater than the internal volume of the lock hopper body 811. The feeder body 814 comprises a mechanical agitator comprising drive unit 815 and blades 816, operable to aid the fall of feed material through the feeder body 814. The lock hopper body 811 and the feeder body 814 are also provided with level sensors for detecting feed material levels. Operation of slide vales 812, 813 is dependent on the feed material levels detected by the level sensors.

Figure 8B:
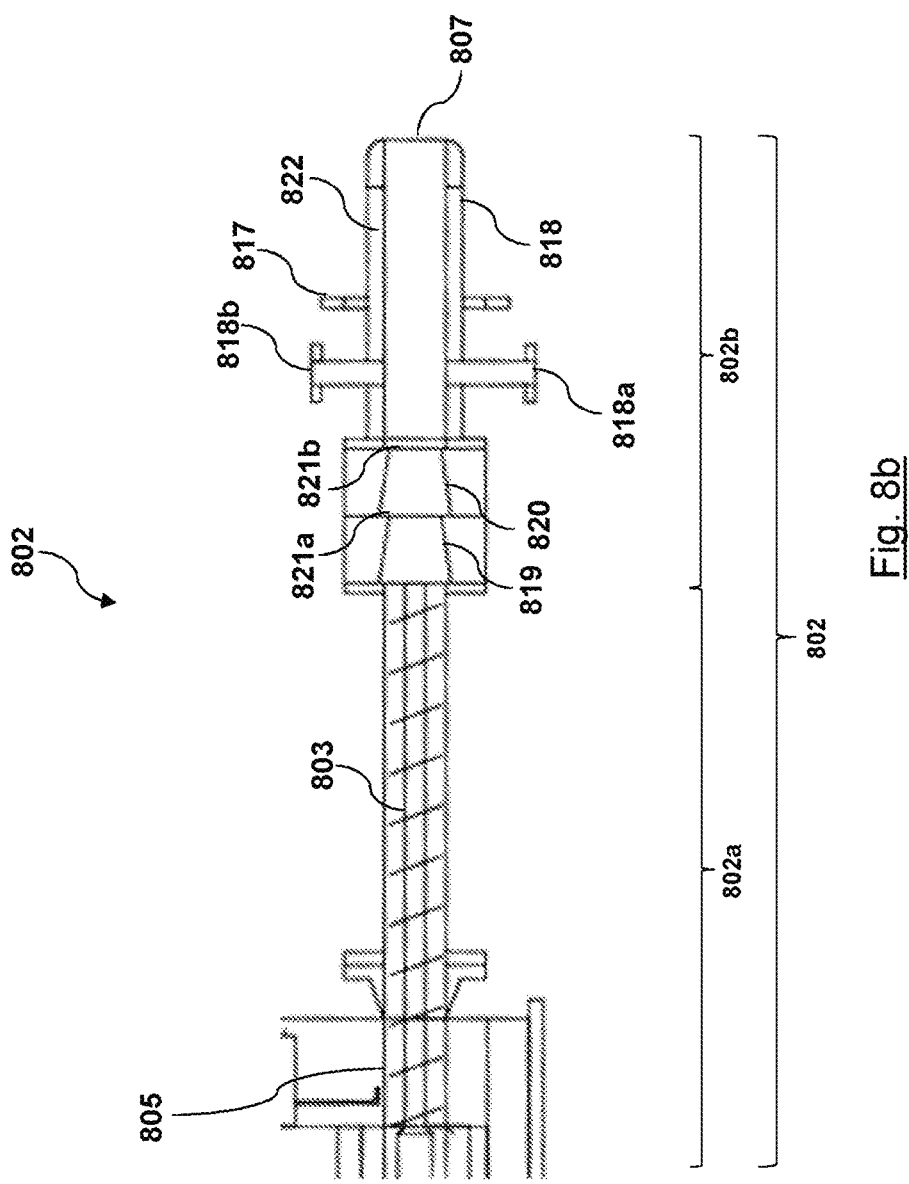

FIG. 8b shows an enlarged view of the feed conduit 802 of the feed system 801 of FIG. 8a. Features shown in FIG. 8b that correspond to features shown in FIG. 8a are provided with the same reference numerals.

The internal diameter of the second section 802b varies along its length, including a first contracting tapered portion 819, a second contracting tapered portion 820, and a first expanding stepped portion 821a disposed between the first and second contracting tapered portions. The first tapered portion 819 is positioned at the upstream end of the second section 802a, immediately adjacent the downstream end of the auger 803. The second section 802b additionally comprises a constant diameter portion 822 downstream of the second contracting tapered portion 820, and a second outwardly stepped portion 821b disposed between the second contracting tapered portion 820 and the constant diameter portion 822.

It will be appreciated that the manner in which plugs of feed material form and disperse in the second section of the feed conduit 802b of FIG. 8b is equivalent to the manner in which plugs of feed material form and disperse in the second section of the feed conduit 602b of FIG. 8b, as described above.

The temperature regulator 818 is a fluid-filled heating and cooling jacket having an inlet 818a and an outlet 818b connected to a heating/cooling fluid supply system (not shown in FIG. 8b). The heating/cooling fluid is water, but may be oil instead. The heating/cooling fluid supply system comprises a fluid heater/cooler and a pump for circulating the fluid through the heating/cooling jacket. The cooling jacket 818 does not surround the portion of the second section 802b in which the contracting tapered portions 8019 and 820 are disposed.

Figure 9A:
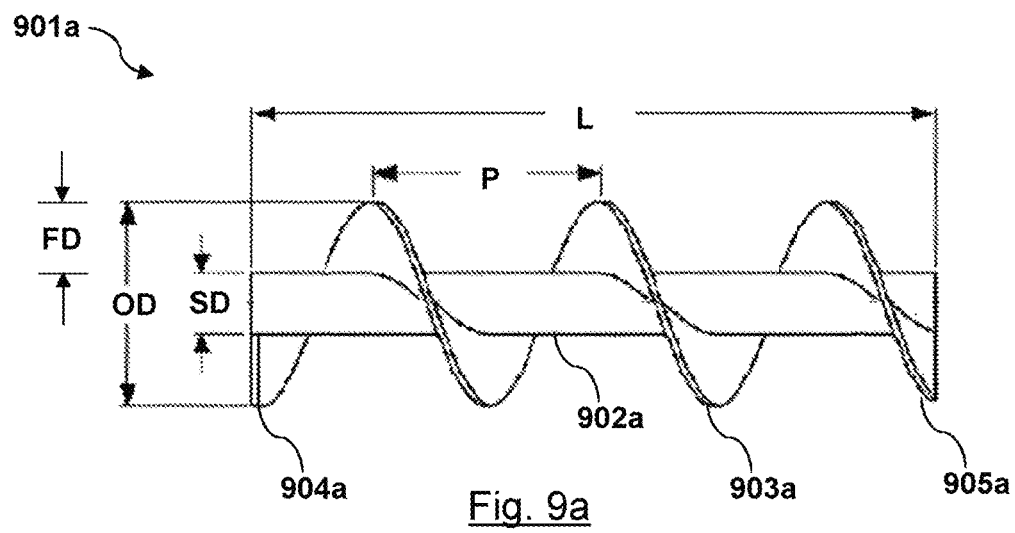
FIGS. 9a to 9d show auger screw designs for use in embodiments of the invention.

FIG. 9a shows an auger screw design for use in the invention. The auger 901a comprises a shaft 902a and a helicoid flight 903a, the shaft 902a having a constant diameter SD along its length. The helicoid flight 903a extends along the whole length of the auger 901a and has a constant outer diameter OD. The difference between the shaft diameter SD and the helicoid flight outer diameter OD is the flight depth FD. The auger 901a has a total length L extending from a proximal end 904a to a distal end 905a. During use, the screw is operated to convey feed material from the proximal end 904a to the distal end 905a. Thus, the proximal end is the downstream end, and the distal end is the upstream end, of the auger 901a. The helicoid flight 903a has a constant pitch P along its length. Appropriate dimensions are chosen, for example, in dependence on the nature of the feed material and the power rating of the auger drive system. It will be appreciated that the shaft 902a may extend beyond the proximal end 904a, or otherwise be connected to a drive system (not shown in FIG. 9a).

Figure 9B:
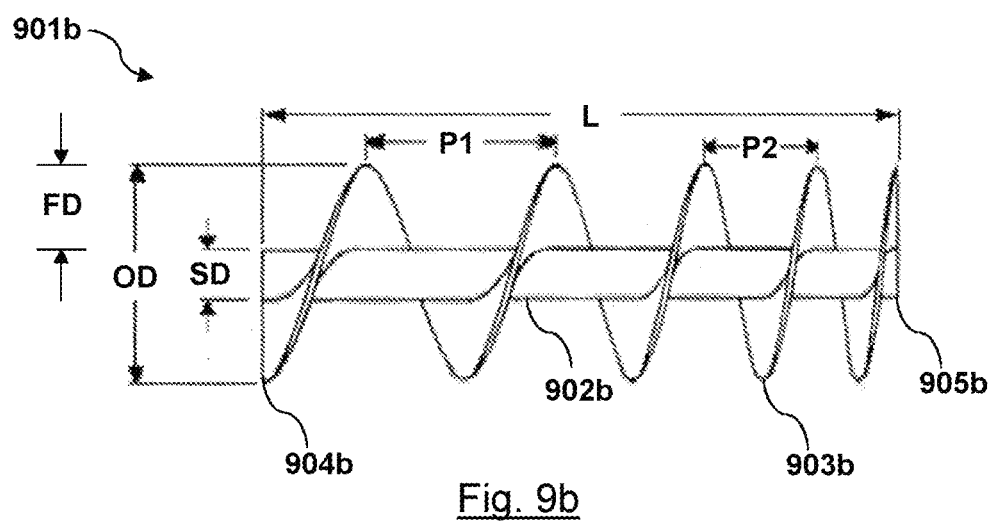

FIG. 9b shows another auger screw design for use in the invention. Features shown in FIG. 9b that correspond to features shown in FIG. 9a are provided with the same reference numerals (with the suffice 'a' replaced by the suffix 'b'). The helicoid flight 903b extends along the whole length of the auger 901b, and has a variable pitch P along the length L of the auger 901b. The pitch P reduces from the proximal end 904b to the distal end 905b of the auger 901b. Accordingly, pitch P1 is greater than pitch P2. A reducing pitch acts to compact feed material as it is conveyed along the auger, and to provide a higher push force at the exit of the auger.

Figure 9C:
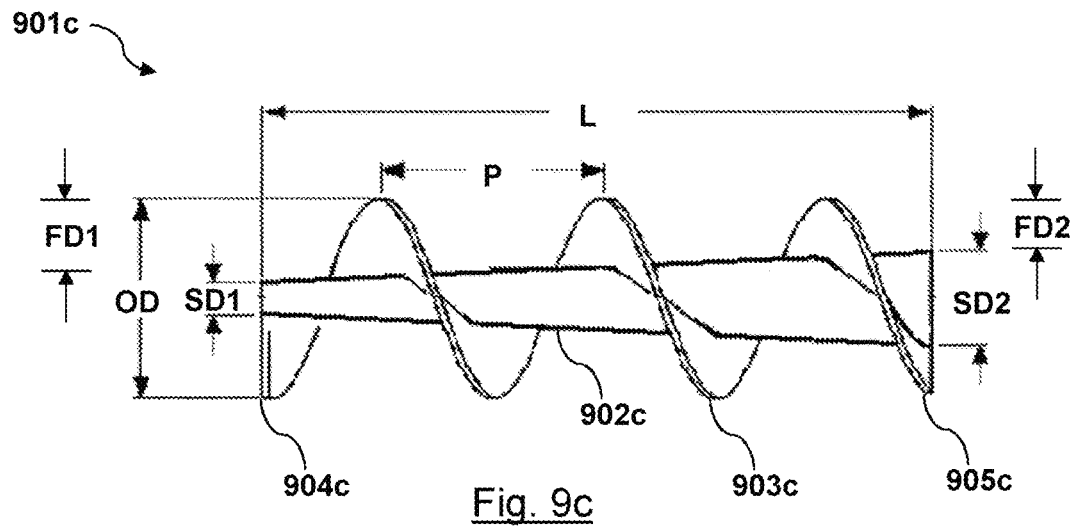

FIG. 9c shows another auger screw design for use in the invention. Features shown in FIG. 9c that correspond to features shown in FIG. 9a are provided with the same reference numerals (with the suffice 'a' replaced by the suffix 'c'). The shaft 902d has a variable shaft diameter SD along the length L of the auger 901c. The shaft diameter SD increases continuously from a shaft diameter SD1 at the proximal end 904c of the auger to a shaft diameter SD2 at the distal end 905c of the auger 901c (i.e. SD2 is larger than SD1). The helicoid flight 903c extends along the whole length of the auger 901c and has a constant outer diameter OD. The difference between the shaft diameter SD and the helicoid flight outer diameter OD is the flight depth FD.

Accordingly, the flight depth FD of the helicoid flight 903c decreases along the length L of the auger as the shaft diameter SD increases. During use of the screw, the increase in shaft diameter SD and decrease in flight depth FD along the length L of the auger 901c promotes compaction of feed material as it is conveyed from the proximal end 904c to the distal end 905c. It will be appreciated that a variable diameter shaft may optionally be used with a variable pitch helicoid flight.

Figure 9D:
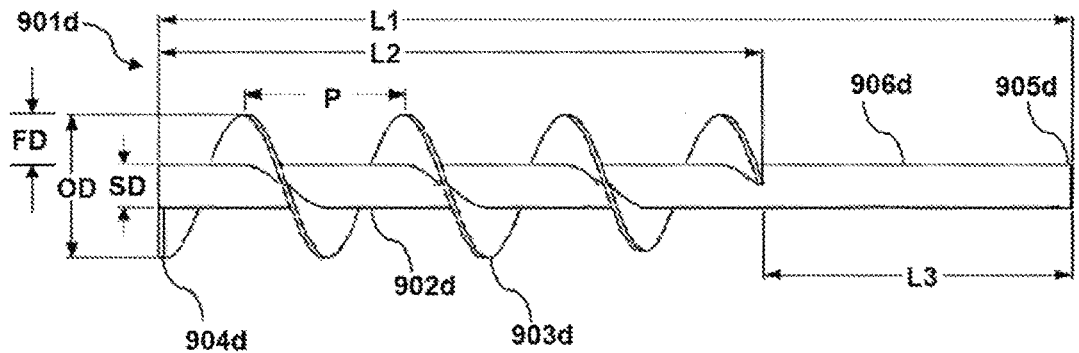

FIG. 9d shows another auger screw design for use in the invention. Features shown in FIG. 9d that correspond to features shown in FIG. 9a are provided with the same reference numerals (with the suffice 'a' replaced by the suffix 'd'). The auger 901d has a total length L1 extending from the proximal end 904d to the distal end 905d. The helicoid flight 903d extends along only a portion of the auger 901d. The helicoid flight 903d extends along length L2 of the auger 901d, from the proximal end 904d to a point intermediate the proximal end 904*d* and the distal end 905*d*. The shaft 902*d* continues for a length L3 beyond the discharge end of the helicoid flight 903*d* to the distal end 905*d* of the auger 901*d*. This section of the shaft 902*d* having length L3 is referred to as the shaft extension 906*d*. During use of the screw, the presence of the shaft extension 906*d* constricts the space in the feed conduit, thereby promoting compaction. It will be appreciated that such a shaft extension may optionally be used with a variable pitch helicoid flight and/or a variable diameter shaft.

Figure 10:
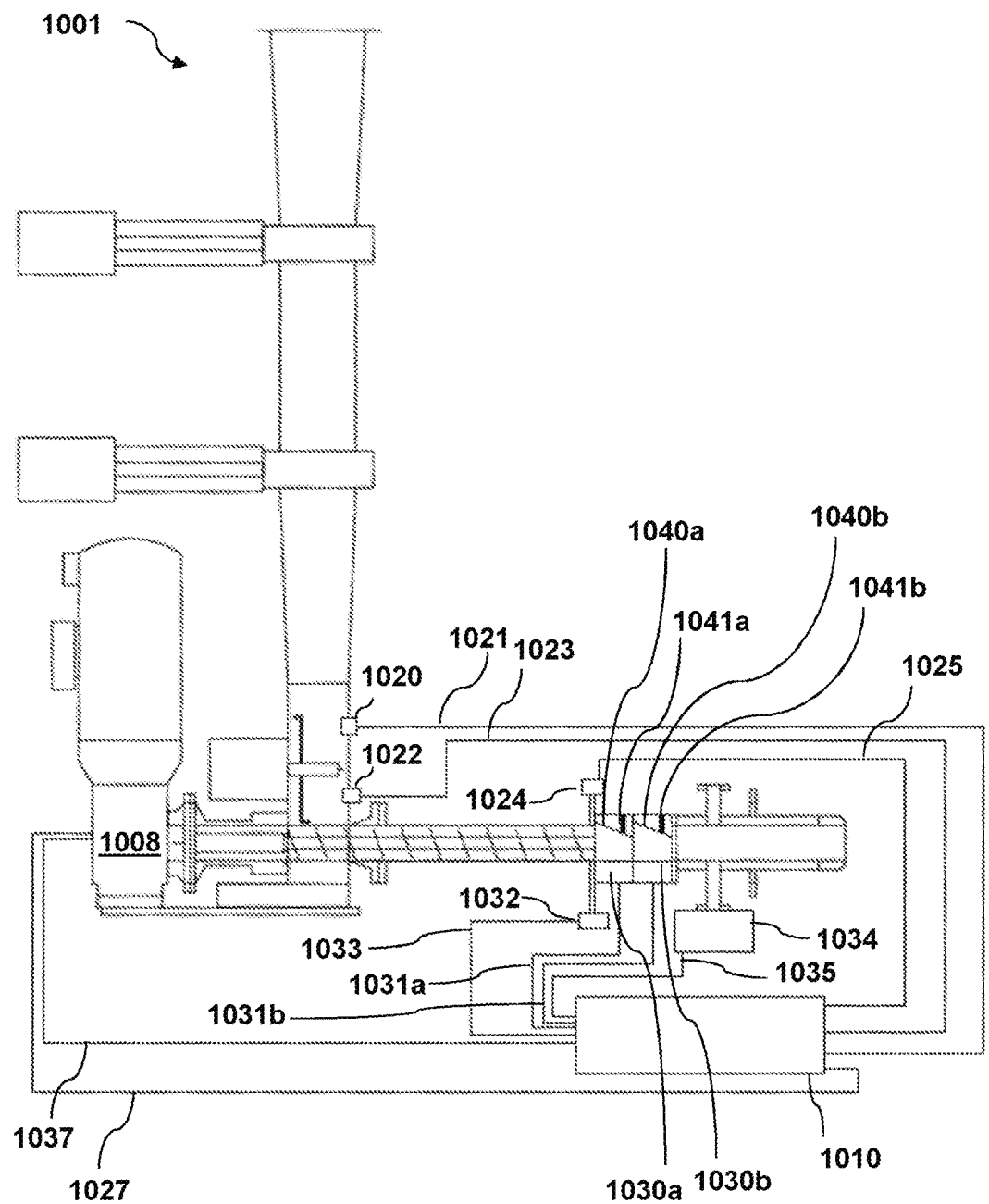
FIG. 10 shows a side view of the feed system of FIGS. 8a and 8b fitted with an adjustable contracting portion, sensor system and control system.

FIG. 10 shows a side view of a feed system 1001 substantially the same as the feed system 801 of FIGS. 8*a* and 8*b*, except that the two contracting portions in the second section of the feed conduit are separately adjustable contracting portions 1030*a* and 1030*b*. The Feed system 1001 is also shown with a sensor system and a control system. For clarity, those features of the feed system 1001 that are the same as features of the feed system 801 are not labelled. The adjustable contracting portions 1030*a* each comprise a mechanically adjustable taper plate 1040*a*, 1040*b* actuated by a mechanical actuator 1041*a*, 1041*b*. The mechanically adjustable taper plates 1040*a*, 1040*b* are independently adjustable from a taper angle of 0 degrees (i.e. diameter through the adjustable tapered portion is substantially constant along its length) to 10 degrees. The taper plates 1040*a*, 1040*b* are configured to be movable into the conduit, reducing the cross-sectional area available for feed material to pass through. It will be appreciated that the adjustable tapered portions are depicted schematically in FIG. 10, and that the precise arrangement of the taper plates and actuators may vary. For example, each portion may comprise a plurality of taper plates disposed around the inner circumference of the conduit and/or the cross-sectional shape of the conduit may vary. It will also be appreciated that, depending on the mode of operation, the adjustable contracting portions may each define a plug-forming zone with a release zone between them, or one or both of the adjustable contracting portions may be operated to cause a preliminary compaction of material upstream of a plug-forming zone. The sensor system comprises a plurality of sensors at various locations upstream of the adjustable contracting portions, including a temperature sensor 1024 immediately adjacent the upstream adjustable tapered portion 1030*a*, a pressure sensor 1022 in the feeder body, and a light hydrocarbon gas sensor 1020 also in the feeder body. In the embodiment shown in FIG. 10, the feeder body 814 is able to operate as an airlock. If pyrolysis gases in the feeder body (as detected by the gas sensor 1020) exceed a pre-determined threshold (e.g. 1 ppm), the feeder body is purged with an inert gas before the feed material outlet valve of the lock hopper assembly is opened. It will be appreciated that further gas and/or pressure sensors may be included in the lock hopper assembly. The gas, pressure and temperature sensors 1020, 1022, 1024, continually feed data to the control system 1010 via lines 2021, 2023 and 1025, respectively. The variable speed drive system for the auger includes a control module 1008 that feeds data on load experienced by the drive system to the control system 1010 via line 1027. During operation, the control system continually monitors data received from the sensor system and the drive system to estimate plug integrity in the plug-forming zone. The feed system includes various items of control equipment that can be operated to adjust plug formation, including the adjustable contracting portions 1030*a*, 1030*b*, a fluid temperature controller 1034 for the temperature regulator, a lubricating fluid supply system 1032 for supplying lubricating fluid into the feed conduit immediately upstream of the adjustable contracting portions, and the variable speed drive system controller 1008. In response to data received from the sensor system and the drive system, the control system 1010 automatically adjusts operation of the control equipment. The control system communicates with the adjustable contracting portions 1030*a*, 1030*b*, via lines 1031*a*, 1031*b*, with the fluid temperature controller 1034 via line 1035, with the lubricating fluid supply system 1032 via line 1033, and with the drive system controller 1008 via line 1037. It will be appreciated that a properly functioning feed system does not necessarily need to include all of the sensor and control equipment shown in FIG. 10. On the contrary, safe and reliable operation may be achieved without having any dynamic control of the feed system, instead relying on the pre-determined geometry of the plug-forming zone to ensure formation of an adequate plug. The present disclosure includes embodiments having any combination of sensor and control equipment.

Figure 11A:
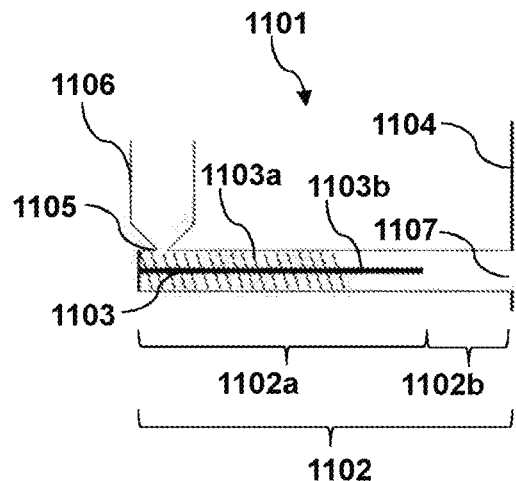
FIGS. 11a and 11b show schematic views of a feed system according to another embodiment of the invention with and without feed material present.

In FIG. 11*a*, a feed system 1101 is shown empty of feed material, the feed system 1101 comprising a feed conduit 1102 having first and second sections 1102*a*, 1102*b* and an inlet 1105 and an outlet 1107, an auger 1103 in the first section 1102*a*, and a feed material hopper 1106 connected to the inlet 1105. The outlet 1107 is provided for discharging feed material directly into a pyrolysis reactor 1104 (only a section of the wall of reactor 1104 is shown in FIG. 11*a*). The feed conduit 1102 is linear, defining a straight internal bore. The auger 1103 comprises a helicoid flight 1103*a* and a shaft 1103*b*. The helicoid flight 1103*a* extends along a first portion of the shaft 1103*b* of the auger 1103, while the shaft continues a further distance through the first section 1102*a* of the feed conduit 1102 towards the second section 1102*b*. That section of the shaft extending beyond the helicoid flight is referred to as the shaft extension. The shaft 1103*b* has a constant diameter along its length.

Figure 11B:
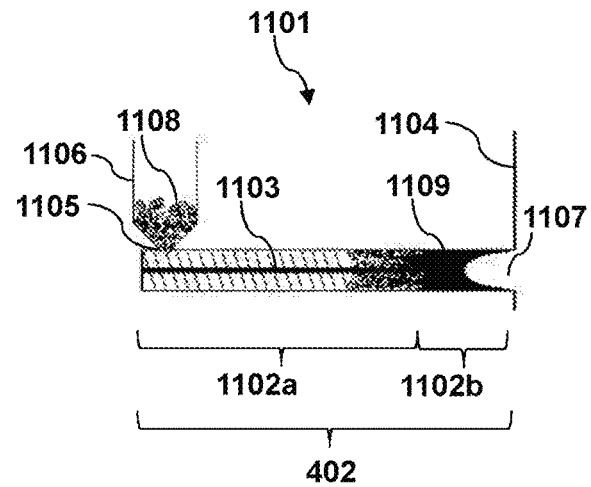

In FIG. 11*b*, the feed system 1101 of FIG. 11*a* is shown in use and containing feed material 1108. Features shown in FIG. 11*b* that correspond to features shown in FIG. 11*a* are provided with the same reference numerals. Feed material is collected in the hopper 1106 and conveyed through the conduit 1102 in much the same manner as in the feed system 401 of FIG. 4*b*. The shaft extension acts to restrict free space in the conduit, thereby increasing flow resistance and encouraging some agglomeration and compaction of feed material before formation of the plug of feed material 1109 in the second section 1102*b* of the conduit 1102.

Figure 12A:
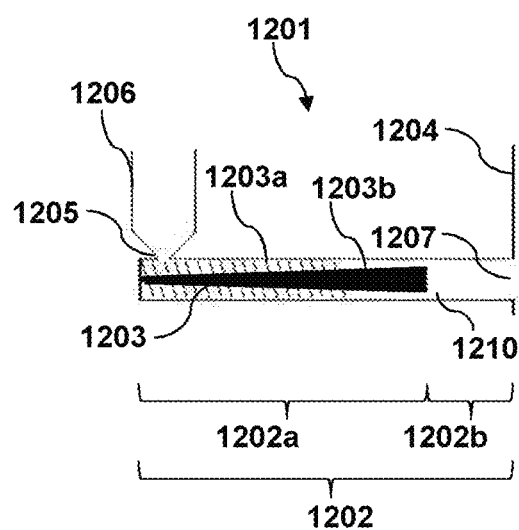
FIGS. 12a and 12b show schematic views of a feed system according to another embodiment of the invention with and without feed material present.

In FIG. 12*a*, a feed system 1201 is shown empty of feed material, the feed system 1201 comprising a feed conduit 1202 having first and second sections 1202*a*, 1202*b* and an inlet 1205 and an outlet 1207, an auger 1203 in the first section 1202*a*, and a feed material hopper 1206 connected to the inlet 1205. The outlet 1207 is provided for discharging feed material directly into a pyrolysis reactor 1204 (only a section of the wall of reactor 1204 is shown in FIG. 11*a*). The feed conduit 1202 is linear, defining a straight internal bore. The auger 1203 comprises a helicoid flight 1203*a* and a shaft 1203*b*. The helicoid flight 1203*a* extends along a first portion of the shaft 1203*b* of the auger 1203, while the shaft continues a further distance through the first section 1202*a* of the feed conduit 1202 towards the second section 1202*b*. That section of the shaft extending beyond the helicoid flight is referred to as the shaft extension. The shaft 1203*b* has a variable diameter along its length, the shaft diameter increasing gradually and continuously from the upstream end of the auger to the downstream end of the auger 1202.

Figure 12B:
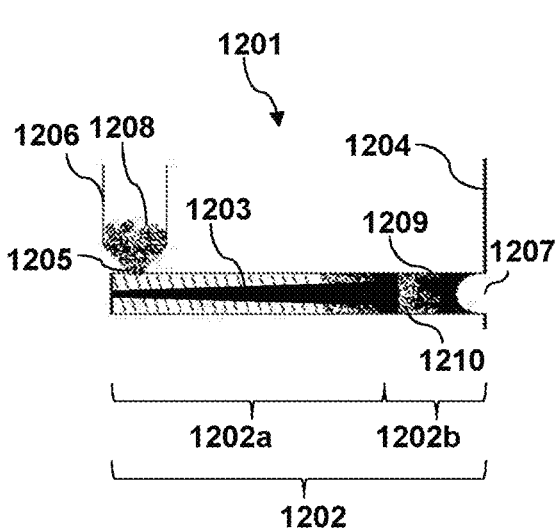

In FIG. 12*b*, the feed system 1201 of FIG. 12*a* is shown in use and containing feed material 1208. Features shown in FIG. 12b that correspond to features shown in FIG. 12a are provided with the same reference numerals. Feed material is collected in the hopper 1206 and conveyed through the conduit 1202 in much the same manner as in the feed system 401 of FIG. 4b. As in the feed system shown in FIG. 11a, the shaft extension acts to restrict free space in the conduit, thereby increasing flow resistance and encouraging some agglomeration and compaction of feed material before formation of the plug of feed material 1209 in the second section 1202b of the conduit 1202. Furthermore, the increasing diameter of the shaft 1203b along its length also assists in compaction and agglomeration of the feed material before it reaches the second section 1202b of the conduit 1202. As shown in FIG. 12b, the increase in shaft diameter can promote plug-like compaction of the feed material towards the along the shaft extension. The increase in conduit free space at the end of the auger section provides a release zone upstream of the plug-forming zone in the second section 1202b of the conduit 1202.

Figure 13:
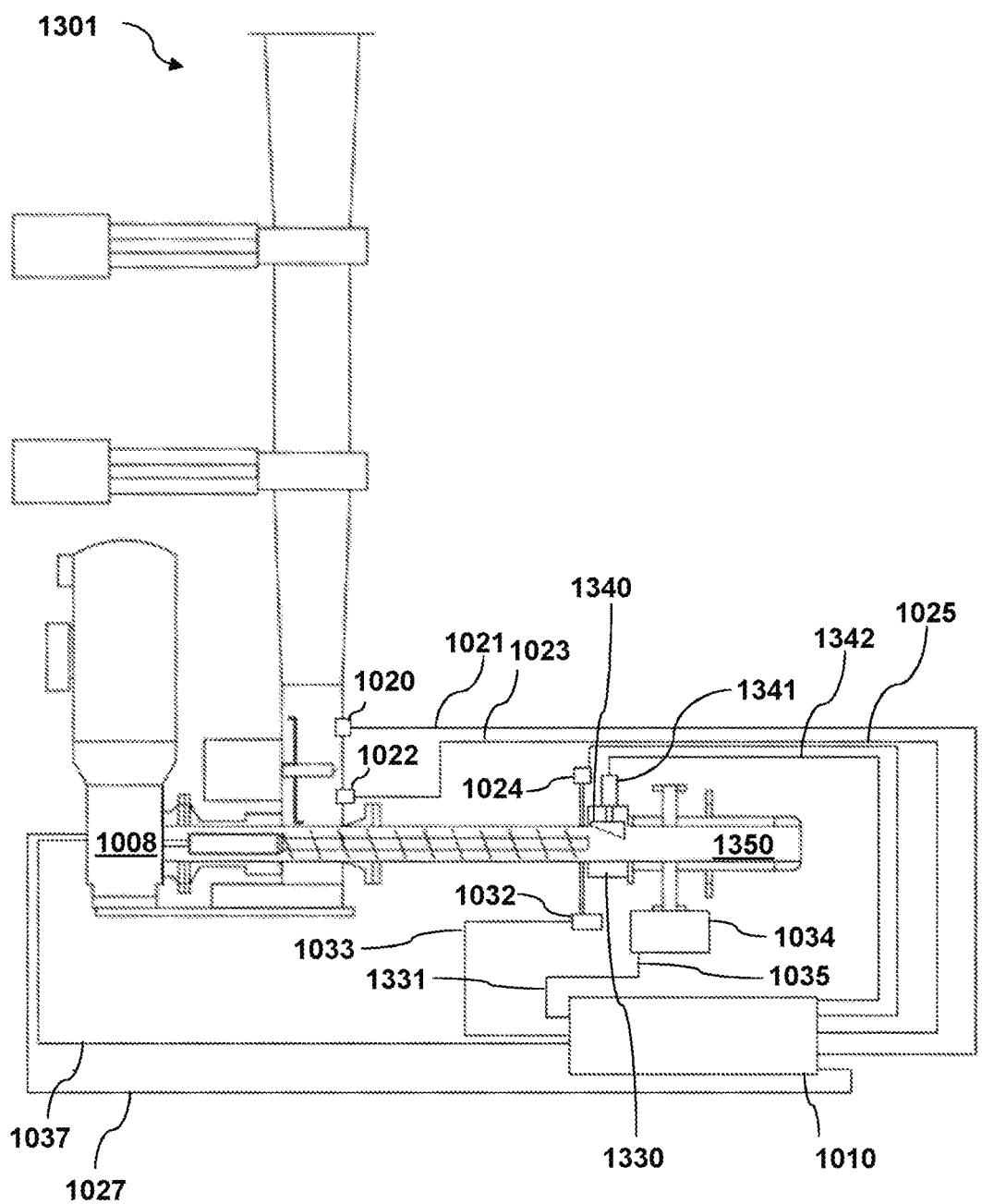
FIG. 13 shows a side view of the feed system of FIG. 10 fitted with an alternative adjustable contracting portion.

FIG. 13 shows a side view of a feed system 1301 that is substantially the same as the feed system 1001 of FIG. 10, except that the separately adjustable contracting portions 1030a and 1030b in the second section of the feed conduit are replaced by adjustable contracting portion 1330. Features shown in FIG. 13 that correspond to features shown in FIG. 10 are provided with the same reference numerals. Adjustable contracting portion 1330 comprises a feed contacting member 1340 movable (i) towards and (ii) away from the longitudinal axis of the second section of the feed conduit, and a mechanical actuator 1341 configured to move the feed contacting member 1340 in response to a control signal received from the control system 1010, which communicates with the adjustable contracting portion 1330 via line 1342. It will be appreciated that, in addition or as an alternative to mechanical actuator 1341, adjustable contracting portion 1330 can comprise a resiliently deformable member (e.g. a spring) that is similarly configured to move the feed contacting member 1340. Feed contacting member 1340 is in the form of a piston extendable into the second section of the feed conduit and is movable between a first, open position and a second, closed position. In use, when feed contacting member 1340 is moved into the closed position, the cross-sectional area available for feed material (not shown) to pass through is reduced. Conversely, when feed contacting member 1340 is moved into the open position, the cross-sectional area available for feed material to pass through is increased. The adjustable contracting portion 1330 can be operated to aid control of compaction of feed material at the upstream end of, or upstream of, a plug-forming zone.

Figure 14A:
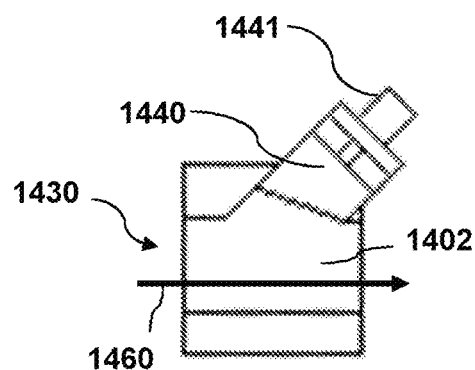
FIGS. 14a, 14b and 14c show cross-sectional side views of an adjustable contracting portion according to an embodiment of the invention.
Figure 14B:
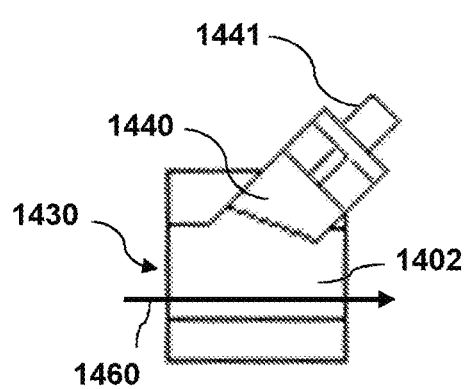
Figure 14C:
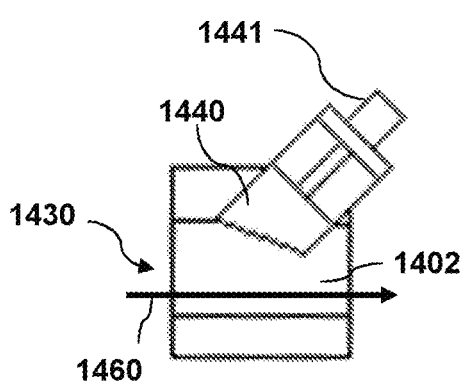

FIGS. 14a, 14b and 14c show a cross-sectional side view of adjustable contracting portion 1430 forming part of feed conduit 1402. Adjustable contracting portion 1430 comprises feed contacting member 1440 and mechanical actuator 1441, which is configured to move the feed contacting member 1440 in response to a control signal, for example a control signal provided by an adjustable contracting portion control system (not shown). Suitable software can be employed to determine the necessary force to be applied by mechanical actuator 1441. The adjustable contracting portion control system can be configured to dynamically control movement of the adjustable contracting portion 1430 in response to measured operating conditions, such as load on an auger drive system (not shown) and/or detected level of pyrolysis gas upstream of a plug forming zone (not shown) within feed conduit 1402. Feed contacting member 1440 is in the form of a piston that, in use, is extendable into the feed conduit 1402. In use, feed contacting member 1440 is movable (i) towards and (ii) away from the longitudinal axis of feed conduit 1402 (e.g. the longitudinal axis of the second section of feed conduit 1402). The feed contacting member 1440 moves along an axis at an oblique angle to the longitudinal axis of the feed conduit 1402 (in this embodiment, the angle is about 45°, although it will be appreciated that other angles may also be selected). When moving from the first, open position to the second, closed position, the feed contacting member 1440 moves against the flow of feed material, which travels through the feed conduit 1402 in the direction indicated by arrow 1460. In FIG. 14a, the adjustable contracting portion 1430 is shown in a first, open position. In this first, open position the minimum internal cross-sectional area of the adjustable contracting portion 1430 is no less than that of the feed conduit 1402 immediately upstream of the adjustable contracting portion 1430, and the minimum internal diameter of the adjustable contracting portion 1430 is no less than that of the feed conduit 1402 immediately upstream of the adjustable contracting portion 1430. FIG. 14b shows the adjustable contracting portion 1430 in an intermediate position between the first, open position and a second, closed position. It will be appreciated that feed contacting member 1440 is movable between a plurality of positions intermediate the first, open position and the second, closed position, for example continuously variable between the first, open position and the second, closed position. In FIG. 14c, the adjustable contracting portion 1430 is shown in the second, closed position. In this second, closed position, the minimum internal cross-sectional area of the adjustable contracting portion is less than that of the feed conduit 1402 immediately upstream of the adjustable contracting portion 1430, and the minimum internal diameter of the adjustable contracting portion is less than that of the feed conduit 1402 immediately upstream of the adjustable contracting portion 1430.

Figure 15A:
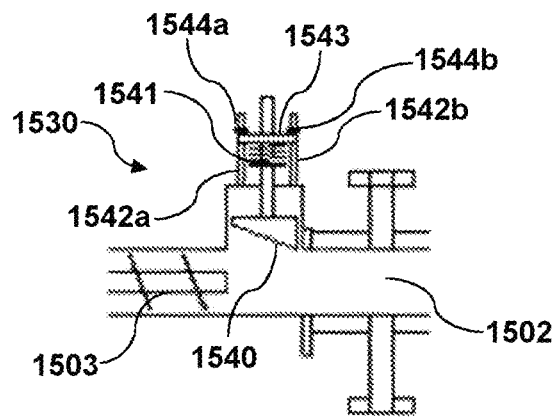
FIGS. 15a, 15b and 15c show cross-sectional side views of another adjustable contracting portion according to a further embodiment of the invention.
Figure 15B:
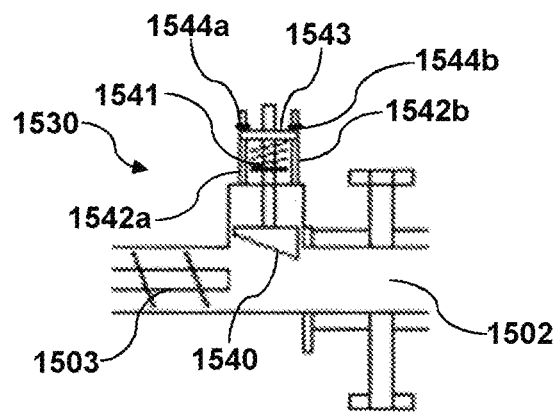
Figure 15C:
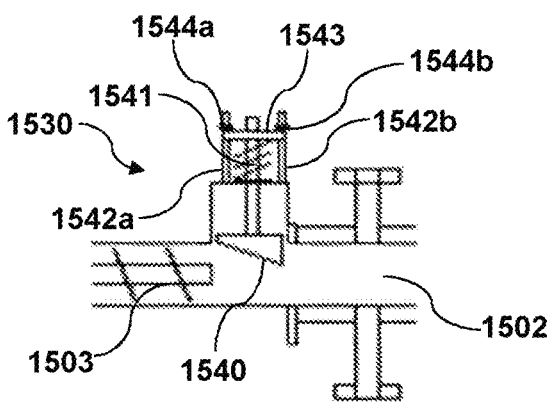
Figure 16A:
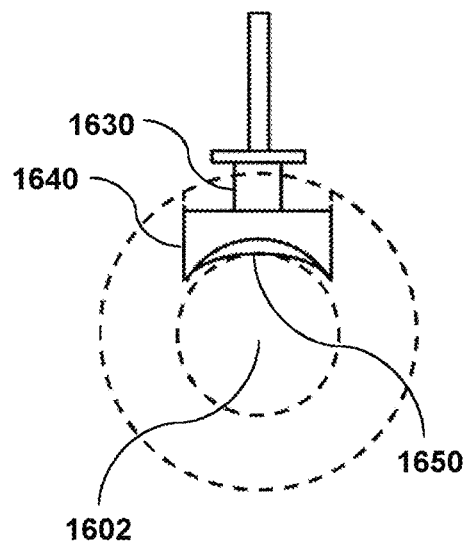
FIGS. 16a to 16d show views of another adjustable contracting portion according to an embodiment of the invention; and, FIGS. 17a to 17d show views of another adjustable contracting portion according to an embodiment of the invention.
Figure 16B:
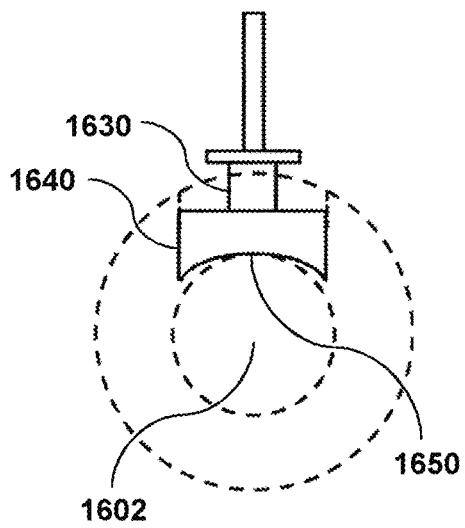
Figure 16C:
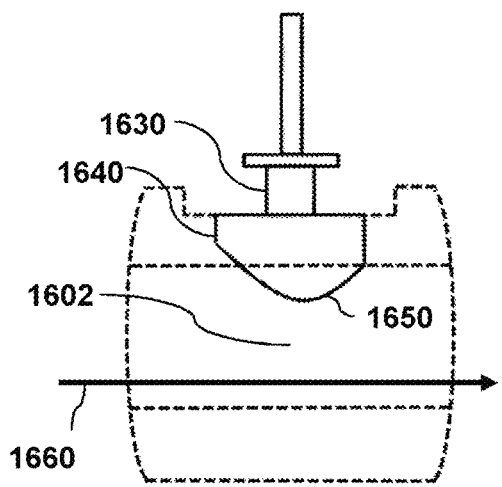
Figure 16D:
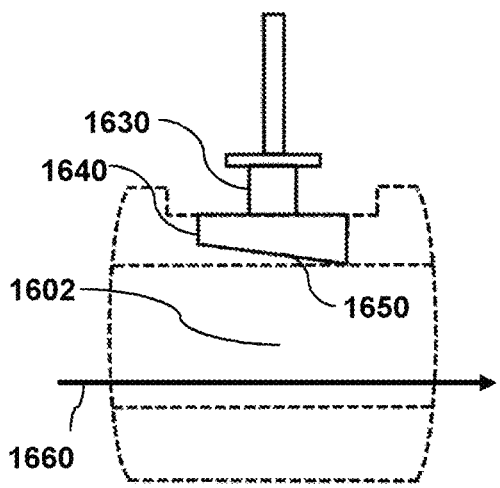
Figure 17A:
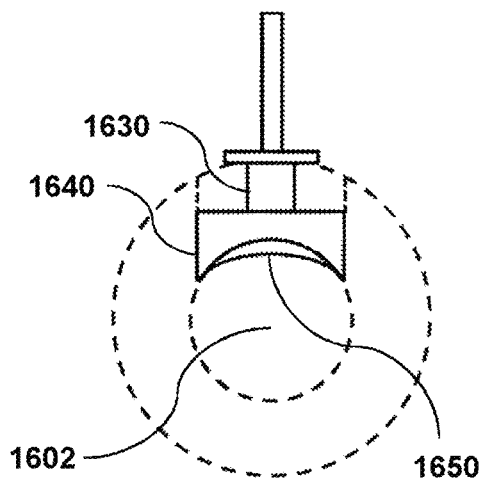
Figure 17B:
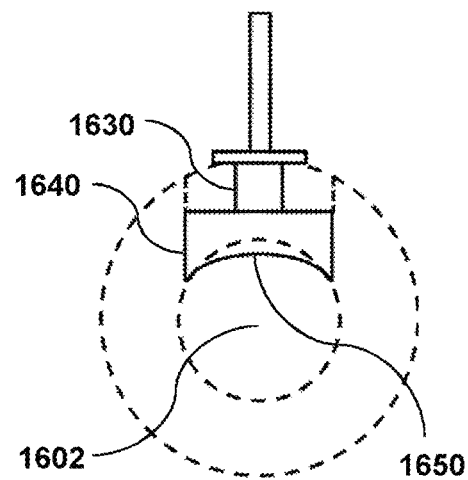
Figure 17C:
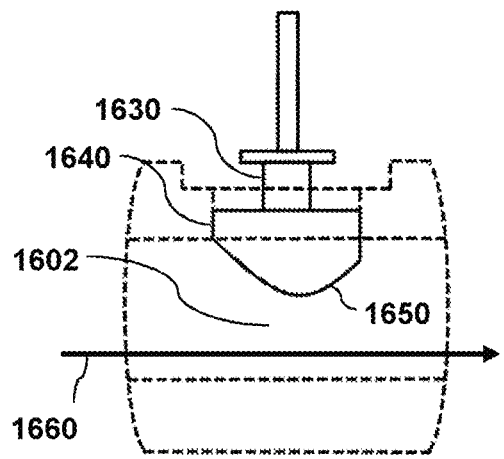
Figure 17D:
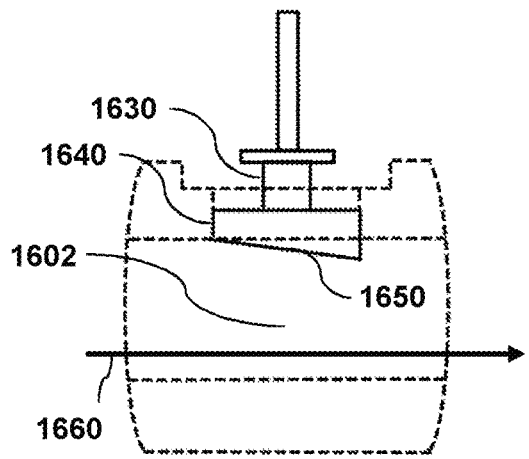

FIGS. 15a, 15b and 15c show a cross-sectional side view of adjustable contracting portion 1530 for use with a feed conduit 1502. It will be appreciated that FIGS. 15a, 15b and 15c show adjustable contracting portion 1530 in a first, open position, an intermediate position, and a second, closed position respectively, similarly to FIGS. 14a, 14b and 14c. Adjustable contracting portion 1530 comprises feed contacting member 1540 and resiliently deformable member 1541, in the form of a spring. Spring 1541 is configured to maintain a pre-determined compression force on feed material (not shown) in the feed conduit 1502. It will be understood that the pre-determined compression force may, for example, be adjusted during operation of a feed system in response to measured operating conditions. It will be understood that spring 1541 can allow for rapid automatic dynamic adjustment of the contracting portion 1530 during operation, in a straightforward and convenient manner. Spring 1541 acts to bias the feed contacting member 1540 towards the second, closed position of FIG. 15c. Threaded rods 1542a, 1542b pass through holes formed in moveable compression plate 1543, and are secured with positioning nuts 1544a, 1544b. It will be appreciated that the number of rods and/or nuts may vary, and is not limited to the number shown in FIGS. 15a to 15c. The height of moveable plate 1543 above feed conduit 1502 can be adjusted by adjusting the position of nuts 1544a, 1544b along the length of threaded rods 1542a, 1542b. As moveable plate 1543 is moved downwards towards the conduit 1502, preloading on resiliently deformable member 1541 increases, increasing the force biasing feed contacting member 1540 towards the closed position of FIG. 15c. FIG. 16a shows a cross-sectional upstream end view of adjustable contracting portion 1630 arranged within feed conduit 1602 (feed conduit 1602 being shown in dotted lines). FIG. 16*b* shows a schematic cross-sectional downstream end view of adjustable contracting portion 1630. FIG. 16*c* shows a schematic side view of the adjustable contracting portion 1630. FIG. 16*d* shows a schematic cross-sectional side view of the adjustable contracting portion 1630. FIGS. 16*a* to 16*d* show the adjustable contracting portion 1630 with feed contacting member 1640 in a first, open position. FIGS. 17*a* to 17*d* show the adjustable contracting portion 1630 of FIGS. 16*a* to 16*d* having feed contacting member 1640 in a second, closed position. Adjustable contracting portion 1630 is configured so that, in use, in all operating positions (meaning the first, open position as shown in FIGS. 16*a* to 16*d*, the second, closed position as shown in FIGS. 17*a* to 17*d*, and any intermediate position), any contraction of the feed conduit 1602 is a tapered contraction. When feed contacting member 1640 is in the first, open position of FIGS. 16*a* to 16*d*, there is no stepped contraction of the feed conduit 1602 at the downstream end of the adjustable contracting portion 1630. Additionally, when the feed contacting member 1640 is in the second, closed position of FIGS. 17*a* to 17*d*, there is no stepped contraction of the feed conduit 1602 at the upstream end of the adjustable contracting portion 1630. Feed contacting member 1640 comprises a feed contacting surface 1650 that is shaped so that, in use, it cooperates with the internal shape of the feed conduit 1602, to provide a tapered contraction of the feed conduit 1602 in all operating positions of the feed contacting member 1640. In FIGS. 16*a* to 17*d*, feed conduit 1602 is in the form of a tube having a cylindrical bore, and feed contacting surface 1650 is shaped to cooperate with the internal shape of the tube. Thus, feed contacting surface 1650 has a curved shape that curves around the longitudinal axis of tubular feed conduit 1602. The feed contacting surface 1650 is also oblique to the longitudinal axis of the feed conduit 1602, so that the surface 1650 forms a section of the surface of a notional cone. The notional cone has a longitudinal axis parallel to the longitudinal axis of the feed conduit 1602. The longitudinal axis of the notional cone lies along the longitudinal axis of the feed conduit 1602 when the feed contacting member 1640 is in the second, closed position of Figures 17*a* to 17*d*. The notional cone tapers to a point (i.e. the tip of the notional cone) downstream of adjustable contracting portion 1630. It will be appreciated that adjustable contracting portion 1630 may comprise a mechanical actuator (not shown) configured to move feed contacting member 1640 in response to a control signal, for example a control signal provided by an adjustable contracting portion control system (not shown). Additionally or alternatively, the adjustable contracting portion may comprise a resiliently deformable member (not shown) such as a spring, configured to maintain a predetermined compression force on feed material in the feed conduit during operation. In use, feed material flows in the direction marked by arrow 1660. It will be appreciated that the minimum internal diameter of the adjustable contracting portion 1630 is measured as the height of the conduit 1602; the width of the conduit 1602 is unchanged by movement of the feed contacting member 1640.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A feed system for supplying a feed material to a pyrolysis reactor, wherein the feed system comprises a feed conduit having an inlet for receiving the feed material, and an outlet for discharging the feed material into the pyrolysis reactor, the feed conduit having a first section comprising the inlet and a second section comprising the outlet, the first section accommodating an auger, and the second section having a length to average internal diameter ratio of from 4:1 to 20:1 and comprising at least one plug forming zone, wherein the auger is configured to convey the feed material from the inlet towards the outlet and to discharge the feed material into the second section, wherein the second section comprises at least one contracting portion and wherein the plug forming zone is sized and configured such that the feed material so discharged by the auger accumulates into a plug of feed material that provides a gas barrier between the outlet and the inlet of the feed conduit,
wherein the feed system further comprises a temperature regulator downstream of the at least one contracting portion for controlling a temperature of the plug forming zone of the second section, and/or a portion of the second section downstream of the plug forming zone; and
wherein the temperature regulator comprises a cooling jacket that is switchable between a cooling mode and a heating mode, wherein the jacket is provided adjacent the feed conduit.

2. The feed system according to claim 1, wherein the feed conduit comprises at its second end an insulating connector for joining the feed system to the pyrolysis reactor.

3. The feed system according to claim 1, wherein the second section has a length to average internal diameter ratio of-from 5:1 to 15:1.

4. The feed system according to claim 1, wherein the second section has a constant internal diameter along its length.

5. The feed system according to claim 1, wherein the second section has an internal diameter that varies along its length.

6. The feed system according to claim 5, wherein the at least one contracting portion is in the at least one plug forming zone.

7. The feed system according to claim 6, wherein the at least one contracting portion has a mechanically adjustable taper angle.

8. The feed system according to claim 5, wherein the at least one plug forming zone comprises a first plug forming zone and a second plug forming zone, wherein the second section further comprises the first plug forming zone, the second plug forming zone, and a release zone between the first and second plug forming zones, wherein the release zone is sized and configured to promote disintegration of the plug of feed material formed in the first plug forming zone as the feed material is urged towards the outlet by operation of the auger.

9. The feed system according to claim 8, wherein the second section comprises an expanding portion in the release zone, and/or wherein the feed conduit comprises a fluid inlet and/or a fluid outlet in the release zone.

10. The feed system according to claim 1, comprising a valve assembly connected to the inlet of the feed conduit, the valve assembly adjustable between a first open configuration and a second closed configuration, wherein the valve assembly is operable to (i) control flow of feed material into the feed conduit, and (ii) control flow of gases into and/or out of the feed conduit.

11. The feed system according to claim 10, comprising a sensor system for directly or indirectly detecting pyrolysis gases at a position upstream of the plug forming zone and downstream of the valve assembly, wherein the sensor system includes at least one of:
(i) a gas sensor for detecting light hydrocarbon gases,
(ii) a temperature sensor for measuring gas temperature, and
(iii) a pressure sensor for measuring gas pressure.

12. The feed system according to claim 10, comprising a gas purge system for purging pyrolysis gas from at least a portion of the feed system upstream of the plug forming zone and downstream of the valve assembly.

13. The feed system according to claim 1, comprising a lock hopper assembly for supplying feed material to the inlet of the feed conduit, the lock hopper assembly comprising a lock hopper body, a feed material inlet valve, a feed material outlet valve, and a gas purge assembly, wherein the feed material outlet valve is connected to the inlet of the feed conduit.

14. The feed system according to claim 1, comprising a control system configured to regulate plug formation in the plug forming zone by dynamic adjustment of operating parameters in dependence on estimated plug integrity;
wherein the operating parameters include one or more of:
(i) auger drive system speed, (ii) temperature of the temperature regulator, (iii) taper angle of the at least one contracting portion, if present, and (iv) supply of lubricating fluid to the plug forming zone;
and wherein the control system estimates plug integrity based on information received by the control system on one or more of: (i) pyrolysis gas concentration upstream of the plug-forming zone, (ii) temperature upstream of the plug-forming zone, (iii) gas pressure upstream of the plug-forming zone, and (iv) load on the auger drive system.

15. A pyrolysis reactor assembly comprising the pyrolysis reactor and the feed system according to claim 1, wherein the outlet of the feed conduit is connected to an opening in the pyrolysis reactor, and wherein the pyrolysis reactor assembly is configured such that, when the feed system is in use, feed material exiting the outlet of the feed conduit passes directly into the pyrolysis reactor.

16. The pyrolysis reactor assembly according to claim 15, wherein the pyrolysis reactor is a fluidised bed reactor having a fluidised bed zone, and wherein the inlet of the pyrolysis reactor is located such that, when the pyrolysis reactor and the feed system are in use, feed material exiting the outlet of the feed conduit passes directly into the fluidised bed zone.

17. A feed system according to claim 1, wherein the at least one contracting portion comprises a feed contacting member movable (i) towards and (ii) away from the longitudinal axis of the feed conduit, the feed contacting member being adjustable between a first, open position and a second, closed position, wherein:
in the first, open position, the at least one contracting portion has a first internal cross-sectional area and/or a first minimum internal diameter; and
in the second, closed position, the at least one contracting portion has a second internal cross-sectional area and/or a second minimum internal diameter; and
wherein the second internal cross-sectional area is smaller than the first cross-sectional area, and/or the second minimum internal diameter is less than the first minimum internal diameter.

18. A feed system according to claim 17, wherein the contracting portion comprises a resiliently deformable member for biasing the feed contacting member towards the second closed position.

19. A feed system according to claim 17, wherein the contracting portion comprises a mechanical actuator for moving the feed contacting member between the first, open position and the second, closed position, optionally wherein the mechanical actuator is configured to dynamically control movement of the adjustable contacting member in response to measured system operating conditions.

20. A feed system according to claim 1, wherein the feed material is mixed plastic waste.

21. The feed system according to claim 1, wherein the at least one contracting portion is adjustable or fixed.

22. The feed system according to claim 21, wherein the at least one contracting portion is an adjustable contracting portion wherein the adjustable contracting portion comprises a feed contacting member movable towards and away from a longitudinal axis of the feed conduit;
wherein the feed contacting member is adjustable between an open position and a closed position, wherein:
when in the open position, the adjustable contracting portion has a first internal cross-sectional area and/or a first minimum internal diameter; and
when in the closed position, the adjustable contracting portion has a second internal cross-sectional area and/or a second minimum internal diameter; and
wherein the second internal cross-sectional area is smaller than the first cross-sectional area, and/or the second minimum internal diameter is less than the first minimum internal diameter.

23. The feed system according to claim 1, wherein the second section further comprises at least one fluid inlet separate to the feed inlet and located upstream of the plug forming zone for adding a lubricating fluid to the feed material.

24. A method of supplying a feed material to a pyrolysis reactor with a feed system, wherein the feed system comprises a feed conduit having an inlet for receiving the feed material, and an outlet for discharging the feed material into the pyrolysis reactor, the feed conduit having a first section comprising the inlet and a second section comprising the outlet, the first section accommodating an auger, and the second section having a length to average internal diameter ratio of from 4:1 to 20:1 and comprising at least one plug forming zone, wherein the second section further comprises at least one contracting portion, and wherein the feed system further comprises a temperature regulator downstream of the at least one contracting portion for controlling a temperature of the plug forming zone of the second section, and/or a portion of the second section downstream of the plug forming zone, wherein the temperature regulator comprises a jacket that is switchable between a cooling mode and a heating mode, wherein the jacket is provided adjacent the feed conduit; and
wherein the method comprises operating the auger to convey feed material from the inlet towards the outlet and to discharge the feed material into the second section, and wherein said discharging of the feed material into the second section causes the feed material to accumulate into a plug of feed material in the plug forming zone, thereby forming a gas barrier that inhibits flow of gas into and/or out of the pyrolysis reactor through the feed conduit, and wherein the method further comprises operating the temperature regulator in (i) a cooling mode, and (ii) a heating mode.

25. The method according to claim 24, wherein the method comprises operating the temperature regulator in:
   (i) a first high capacity cooling mode to maintain at least the second section of the feed conduit at a temperature Ti, and
   (ii) a low capacity cooling mode to maintain at least the second section of the feed conduit at a temperature T2, wherein T2 is at least 25° C. greater than Ti.

26. The method according to claim 24, wherein the at least one contracting portion has a taper angle, and wherein the method comprises adjusting the taper angle of the at least one contracting portion to promote or hinder plug formation.

27. The method according to claim 24, wherein the at least one plug forming zone comprises a first plug forming zone and a second plug forming zone, wherein the second section further comprises the first plug forming zone, the second plug forming zone, and a release zone between the first and second plug forming zones, wherein the discharging of the feed material into the second section by the auger causes the feed material to:
   accumulate into a first plug of feed material in the first plug forming zone,
   disperse in the release zone, and
   accumulate into a second plug of feed material in the second plug forming zone;
   wherein, the first plug and the second plug each form a gas barrier that inhibits flow of gas along the feed conduit.

28. The method according to claim 27, wherein the second section comprises at least one fluid inlet and/or at least one fluid outlet in the release zone, and wherein the method comprises at least one of: inserting a fluid into the release zone via said at least one fluid inlet, and withdrawing a fluid from the release zone via said at least one fluid outlet.

29. The method according to claim 24, wherein the feed system further comprises a valve assembly upstream of the plug forming zone, and wherein the method further comprises operating a gas purge system to flush at least a portion of the feed system between the plug forming zone and the valve assembly prior to opening the valve assembly when the light hydrocarbon gas concentration in said portion exceeds a pre-determined limit.

30. The method according to claim 29, wherein the pre-determined limit is 10 ppm.

31. The method according to claim 24, wherein the feed system further comprises a sensor system for directly or indirectly detecting pyrolysis gas upstream of the plug forming zone, and wherein the method further comprises adjusting at least one operating parameter selected from:
   (a) a temperature of at least the second section of the feed conduit;
   (b) an operating rate of the auger;
   (c) a taper angle of the at least one contracting portion; and
   (d) supply of lubricating fluid to the plug forming zone; in dependence on said detection of pyrolysis gas by the sensor system.

32. The method according to claim 31, wherein the method further comprises dynamically adjusting said at least one operating parameter to maintain:
   (i) a light hydrocarbon gas concentration upstream of the plug forming zone at a level of no more than 100 ppm;
   (ii) a gas temperature upstream of the plug forming at a level of no more than 150° C.; and/or,
   (iii) a pressure upstream of the plug forming of no more than 200 mbarg.

33. The method according to claim 24, wherein the method further comprises operating the temperature regulator to maintain at least the second section of the feed conduit at a temperature of from 20° C. to 80° C.

34. The method according to claims 24, wherein the feed system further comprises a lock hopper assembly connected to the inlet of the feed conduit, the lock hopper assembly comprising a catchment hopper, a lock hopper body, a feed material inlet valve, a feed material outlet valve, a feeder body, and a gas purge assembly, and wherein the method further comprises:
   (i) closing the feed material inlet and outlet valves;
   (ii) optionally pressurising the feeder body with inert gas;
   (iii) opening the feed material inlet valve and moving feed material from the catchment hopper to the lock hopper body;
   (iv) closing the feed material inlet valve;
   (v) optionally purging and optionally pressurising the lock hopper body with inert gas;
   (vi) opening the feed material outlet valve and moving feed material from the lock hopper body to the feeder body;
   (vii) closing the feed material outlet valve; and,
   (viii) optionally venting the lock hopper body.

* * * * *